(12) United States Patent
Maeda et al.

(10) Patent No.: US 6,977,782 B2
(45) Date of Patent: Dec. 20, 2005

(54) OBJECT LENS PRODUCING DEVICE AND PRODUCING METHOD

(75) Inventors: Fumisada Maeda, Tokyo (JP); Shinichi Nagashima, Tokyo (JP)

(73) Assignee: Sony Corporation, Tokyo (JP)

(*) Notice: Subject to any disclaimer, the term of this patent is extended or adjusted under 35 U.S.C. 154(b) by 93 days.

(21) Appl. No.: 10/399,867

(22) PCT Filed: Aug. 29, 2002

(86) PCT No.: PCT/JP02/08748

§ 371 (c)(1),
(2), (4) Date: Apr. 29, 2003

(87) PCT Pub. No.: WO03/019547

PCT Pub. Date: Mar. 6, 2003

(65) Prior Publication Data

US 2004/0021951 A1 Feb. 5, 2004

(30) Foreign Application Priority Data

Aug. 29, 2001 (JP) .............................. 2001-260394

(51) Int. Cl.[7] .................................................. G02B 7/02
(52) U.S. Cl. ................................... 359/819; 369/44.14
(58) Field of Search ............................ 359/819, 694; 369/44.14, 823

(56) References Cited

U.S. PATENT DOCUMENTS

| | | | |
|---|---|---|---|
| 5,021,651 A | * | 6/1991 | Ishikawa .................... 250/239 |
| 6,115,347 A | | 9/2000 | Ichimura et al. |
| 6,256,287 B1 | | 7/2001 | Baartman et al. |
| 6,549,346 B2 | * | 4/2003 | Wada et al. ................ 359/814 |
| 6,594,204 B1 | * | 7/2003 | Yamamoto et al. ........ 369/44.14 |
| 6,665,132 B2 | * | 12/2003 | Hendriks et al. ........... 359/819 |
| 2001/0038499 A1 | * | 11/2001 | Baartman et al. .......... 359/821 |
| 2002/0159346 A1 | * | 10/2002 | Kaji ........................ 369/44.32 |

FOREIGN PATENT DOCUMENTS

| | | | |
|---|---|---|---|
| DE | 100 15 953 A1 | 10/2000 | |
| EP | 1 406 105 A1 | 4/2004 | |
| JP | 03066031 A | * 3/1991 | ............ G11B 7/09 |
| JP | 10-255304 | 9/1998 | |

* cited by examiner

*Primary Examiner*—Ricky Mack
(74) *Attorney, Agent, or Firm*—Oblon, Spivak, McClelland, Maier & Neustadt, P.C.

(57) ABSTRACT

An objective lens unit manufacturing apparatus for manufacturing an objective lens unit, with a numerical aperture not less than 0.7, made up by a plurality of lenses, includes a positioning mechanism (31) for positioning one lens (2) in a cylindrically-shaped lens holder (3) of a synthetic resin material, using another lens (1), already mounted and secured to the lens holder, as a reference, and for securing the one lens to the lens holder, for setting relative positions of the one and the other lenses.

8 Claims, 32 Drawing Sheets

1

OBJECT LENS PRODUCING DEVICE AND PRODUCING METHOD

TECHNICAL FIELD

This invention relates to a method and apparatus for producing an objective lens unit made up by a plural number of objective lenses and which may be used with advantage for an optical pickup used in turn for writing information signals on a optical recording medium and for reading out information signals recorded thereon.

BACKGROUND ART

Up to now, an optical recording medium, exemplified by an optical disc, has been used as a recording medium for information signals. An optical pickup device is used for writing or reading out information signals on or from an optical recording medium. The optical pickup device includes a semiconductor laser, as a light source for radiating a light beam to be illuminated on the optical recording medium, and an objective lens unit for condensing the light beam radiated from the semiconductor laser for illuminating the light beam to a signal recording surface of the optical recording medium.

In the optical pickup device, the spot diameter of the light beam illuminated on the signal recording surface of the optical recording medium may be reduced to realize high recording density of the information signals recorded on the optical recording medium to enable readout of the information signals recorded to high density.

For reducing the spot diameter of the light beam illuminated on the signal recording surface of the optical recording medium, it is effective to shorten the wavelength of the light beam radiated from the light source and to enlarge the numerical aperture (NA) of the objective lens condensing the light beam.

The present Assignee has proposed an objective lens unit of a larger numerical aperture (NA) in JP Laying-Open Patent Publication H-8-315404 and JP Laying-Open Patent Publication H-10-123410. The objective lens unit disclosed in this Patent publication is composed of a double-lens set made up of two lenses, and has a numerical aperture not less than 0.7.

Up to now, a lens composed of one lens set made up by a single lens, or so-called a "single lens", has been used extensively as an objective lens unit used in an optical pickup device. The single lens can be prepared by so-called glass mold forming. A lens of high performance can be formed with high reproducibility by fabricating the metal die to high precision and by high precision temperature management during casting. If the lens is to have a larger value of the numerical aperture (NA) of for example 0.7 or larger, a larger refractive power is required of the lens, such that the first surface of the light beam incident side of the lens needs to be a non-spherical surface with a larger curvature. In light of for example mold release properties, it is extremely difficult to form the objective lens unit having a non-spherical surface of a large curvature using a metal die. Moreover, with an objective lens unit having a non-spherical surface of a larger curvature and a larger numerical aperture (NA), the light beam radiated from the light source cannot be condensed accurately on the signal recording surface even on occurrence of perturbations resulting from the slightest tilt relative to the optical axis.

With the objective lens unit comprised of a double-lens set composed of two lenses, as disclosed in the above Publications, the refractive power can be dispersed to two lenses to moderate the curvature of the respective lens surfaces as well as to decrease the non-spherical surface coefficients. Consequently, the objective lens unit can be formed to a desired machining accuracy, using a metal die, so that it becomes possible to suppress deterioration of the optical performance caused by for example the tilt of the lens relative to the optical axis.

With the objective lens unit of a double-lens set composed of two lenses, the respective lenses can be molded with a metal die to prevent its optical characteristics from being deteriorated. However, the respective lenses need to be registered to each other highly accurately, i.e., it is necessary to get the optical axes of the respective lenses of the objective lens unit registered with each other high accurately without producing eccentricity in the respective lenses and to maintain the distance and parallelism between the respective lenses highly accurately.

For producing an objective lens unit of a double-lens set composed of two lenses, there are such a method consisting in causing the laser light to fall on the objective lenses, put together, and in forming an interferometer by the respective lenses to adjust the relative position thereof, and such a method consisting in causing the laser light to be transmitted through the objective lenses put together and in observing the near-field pattern of the laser light to make the adjustment. With these methods, the phenomena observed are not changed independently for respective adjustment parameters, such that adjustment is extremely time-consuming due to many looped procedures required for achieving the final performance.

In assembling, there is such a method which consists in providing a gap between the lens holder 3 and the lens and in adjusting the lens position within the gap range. With this method, an adhesive, such as a UV curable resin, needs to be charged into the gap following the adjustment and cured in situ to secure the lens to the lens holder. The lens secured in position in this manner in the lens holder with an adhesive is likely to undergo misregistration due to environmental changes, such as increasing temperature or humidity.

In order to overcome the problems caused by an adhesive, it has been proposed to set the tilt of the lens and its location along the direction of the optical axis depending on the machining accuracy of the lens holder. That is, a step is formed within the lens holder and the outer rim of the lens is abutted against the step to set the tilt of the lens and its location along the optical axis. If, in this structure, the step is formed high accurately, the lens position can be set similarly accurately.

In the case of, for example, an objective lens unit composed of a double-lens set made up by two lenses, with an effective diameter of 3 mm, it is necessary to maintain parallelism between the two lenses on the order of 0.1 deg. For maintaining this accuracy, it is necessary to maintain the error along the optical axis of the surface of the outer lens rim carried by the step within the lens holder to a value on the order of 1 $\mu$m. It is however extremely difficult to have the two lenses mounted within the lens holder as this high degree of accuracy is maintained. Additionally, depending on the mounting environment, fine dust and dirt on the order of 1 $\mu$m tend to be intruded into a space between the step within the lens holder and the lens to render it difficult to maintain parallelism between the two lenses.

In the case of an objective lens set, comprised of a double lens set composed of two lenses, the distance between the lens surfaces, comprised of curved surfaces of the lenses, may be kept constant to suppress the generation of spherical aberration ascribable to e.g., errors in lens thicknesses, as disclosed in Japanese Laying-Open Patent Publication H-10-255303.

In the lenses with severe conditions of the relevant standard, the assembling accuracy is optimized by adjustment, as the amount of spherical aberration is detected during assembling, to take up an error caused by variations in accuracy of a metal die used for molding a lens, or in the molding conditions. Although the spherical aberration of the lenses being adjusted may be measured using an interferometer, a complicated apparatus is needed, while the production cost is increased.

DISCLOSURE OF THE INVENTION

It is therefore an object of the present invention to provide a method and apparatus for producing a novel objective lens unit, whereby the deficiencies inherent to the aforementioned conventional technique may be overcome.

It is another object of the present invention to provide a method and apparatus for producing a novel objective lens unit, whereby an objective lens unit, with a numerical aperture not less than 0.7, which is made up by plural objective lenses, in which the relative positions of the lenses may be adjusted to high accuracy and in which it is possible to suppress the generation of the spherical aberration, may be produced readily.

For accomplishing these objects, the present invention provides an objective lens unit manufacturing apparatus for manufacturing an objective lens unit, with a numerical aperture not less than 0.7, made up by a plurality of lenses, comprising a positioning mechanism for positioning one lens in a cylindrically-shaped lens holder of a synthetic resin material, using another lens, already mounted and secured to the lens holder, as a reference, and for securing the one lens to the lens holder, for setting relative positions of the one and the other lenses.

The present invention also provides an objective lens unit manufacturing method for manufacturing an objective lens unit, with a numerical aperture not less than 0.7, made up by a plurality of lenses, by positioning a lens in a cylindrically-shaped lens holder of a synthetic resin material, using another lens, already mounted and secured to the lens holder, as a reference, and for securing the one lens to the lens holder, for setting relative positions of the one and the other lenses, in which the method comprises causing a light beam to be incident on the respective lenses in the lens holder, reflecting the light beam, converged by the respective lenses, by a reflecting member, causing the light beam reflected by the reflecting member to be re-incident on the respective lenses to detect focusing error signals with respect to the reflecting member, based on a light beam transmitted through the respective lenses, and determining the amount of the spherical aberration in the light beam transmitted through the respective lenses, based on changes in the focusing error signals when the reflecting member is moved along the optical axes of the respective lenses, to adjust the distance between the respective lenses based on the amount of the spherical aberration.

In a manufacturing method for an objective lens unit, according to the present invention, a lens holder is provided lens inserting sections into which the outer rims of a plurality of lenses are inserted to control the offset of the respective lenses.

Another manufacturing method for an objective lens unit, according to the present invention, is a method for manufacturing an objective lens unit used as an objective lens unit of an optical pickup device for writing or reading out information signals on or from an optical recording medium, wherein the objective lens unit manufacturing apparatus determines the distance between the lens surface closest to the optical recording medium and an end face of a lens holder lying around the lens surface along the optical axis.

In a further manufacturing method for an objective lens unit, according to the present invention, the other lens, used as a positioning reference for the one lens, is the lens remote from the optical recording medium, with the surface of an outer rim of the other lens remote from the optical recording medium being used as a reference surface for positioning the one lens. The surface of an outer rim of the one lens close to the optical recording medium being used as a positioning reference surface. In positioning the lens reference surface, using a positioning member, the parallelism between the reference surface and the positioning member is measured using laser light.

In an objective lens unit manufacturing method for manufacturing an objective lens unit, in positioning the lens reference surface using a positioning member, the parallelism between the reference surface and the positioning member is measured with the reference surface abutting against the positioning member.

In an objective lens unit manufacturing method for manufacturing an objective lens unit, in positioning the lens reference surface, using a positioning member, the lenses are attracted under a pneumatic pressure differential for abutting the reference surface against the positioning member.

In an objective lens unit manufacturing method for manufacturing an objective lens unit, the parallelism between the surface of the outer rim of the other lens remote from the optical recording medium and the surface of the outer rim of the one lens close to the optical recording medium is measured by detecting only the reflected light from the surface of the outer rim of the one lens remote from the optical recording medium, using a photodetector, in a state in which the light is incident on the outer rim of the other lens and in which the light transmitted through the outer rim and reflected by the surface of the outer rim close to the optical recording medium is not returned to the photodetector.

Other objects, features and advantages of the present invention will become more apparent from reading the embodiments of the present invention as shown in the drawings.

BEST MODE FOR CARRYING OUT THE INVENTION

Figure 1:
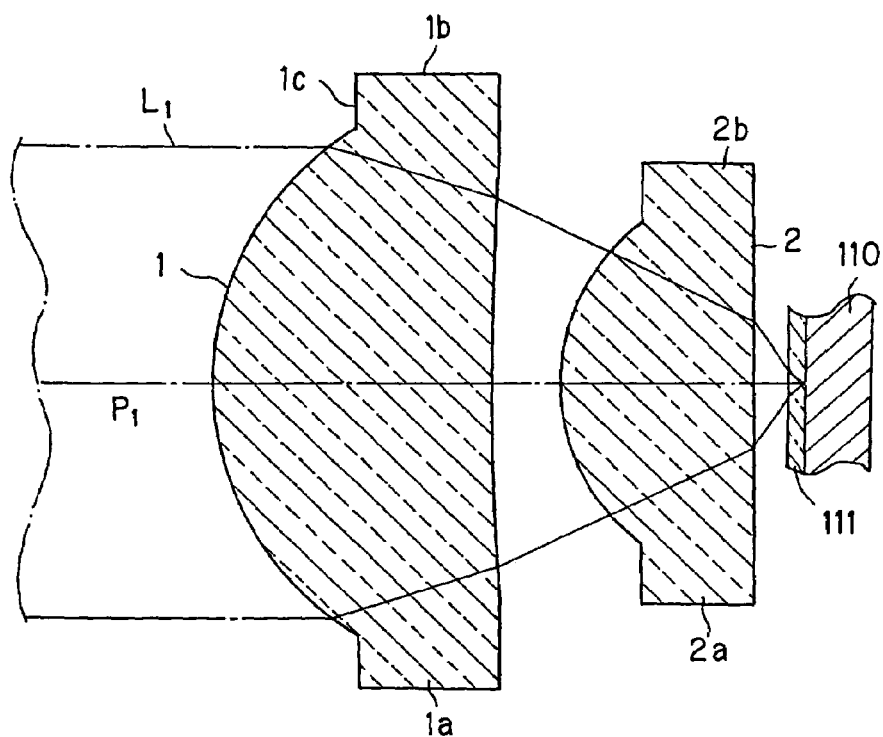
FIG. 1 is a longitudinal cross-sectional view of an objective lens unit according to the present invention.

Referring to the drawings, preferred embodiments of the present invention will be explained in detail.

An objective lens unit of the present invention is made up by plural lenses each having a numerical aperture (NA) of 0.7 or larger. Specifically, the objective lens unit is made up by a double-lens set of two lenses 1, 2, and has a numerical aperture (NA) of 0.85, as shown in FIG. 1.

The objective lens unit of the present invention is built into an optical pickup device having a light source radiating the light beam with a center wavelength of 405 nm. That is, the objective lens unit according to the present invention is mainly used for condensing the light beam having a center wavelength of 405 nm.

Figure 2:
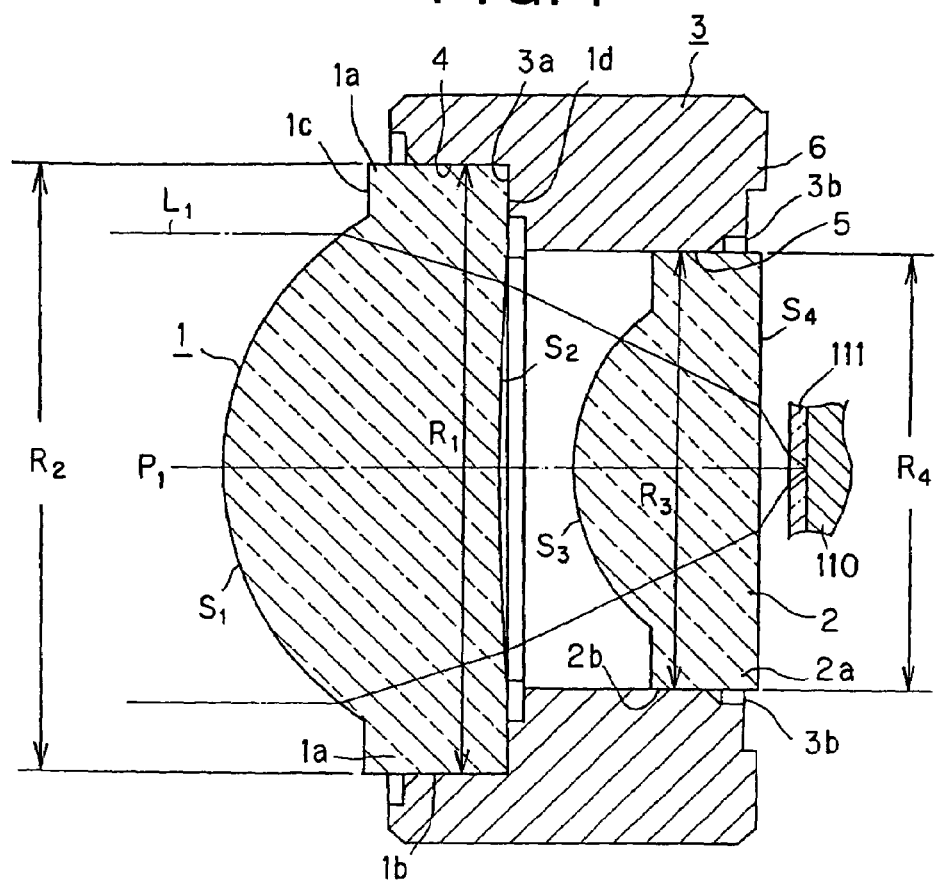
FIG. 2 is a longitudinal cross-sectional view of the objective lens unit built into a lens holder.
Figure 3:
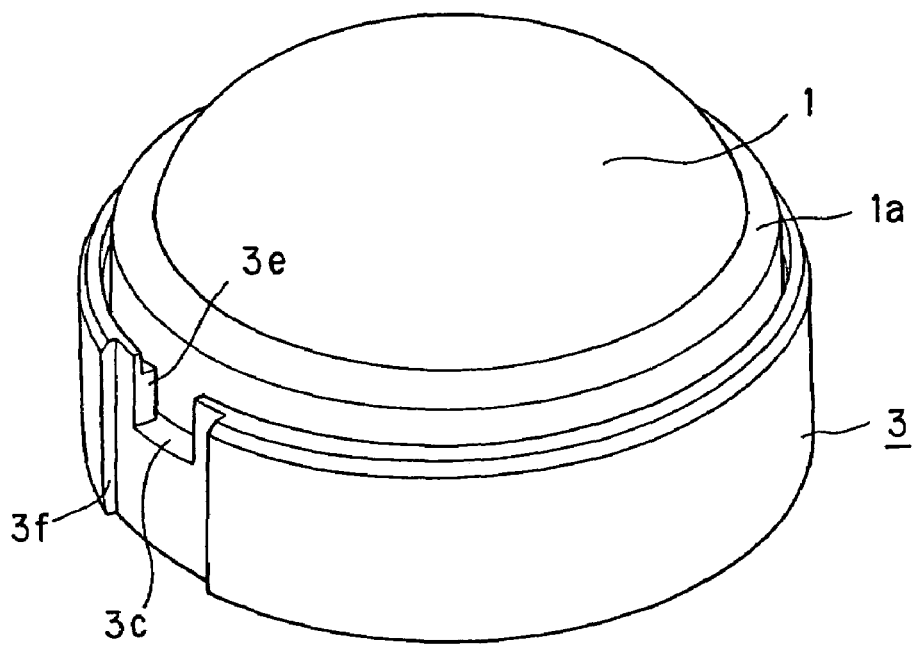
FIG. 3 is a perspective view looking from the first lens.
Figure 4:
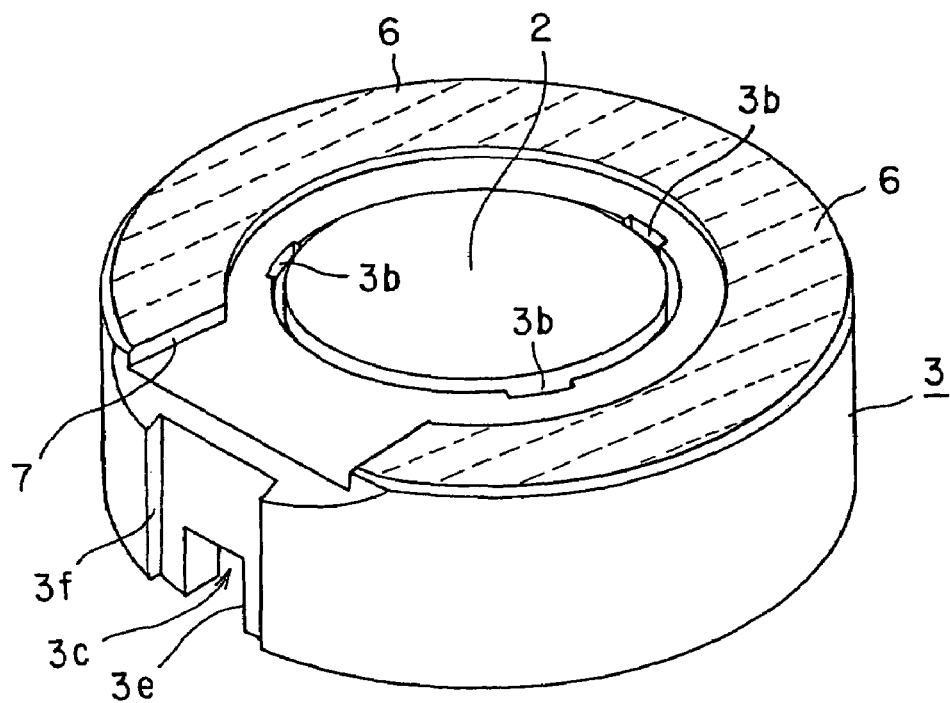
FIG. 4 is a perspective view looking from the second lens.

In the following explanation, it is assumed that the objective lens unit has an effective diameter of 3 mm. Specifically, the manufacturing method for the objective lens unit of the present invention is the method for assembling an objective lens unit. An objective lens unit according to the present invention is made up by first and second lenses 1, 2 and a lens holder 3 for holding the lenses 1, 2, as shown in FIGS. 2, 3 and 4.

The first and second lenses 1, 2 are formed of a vitreous material, and are prepared by so-called glass mold casting of forming a vitreous material using a metal die. The shape of the lens surfaces of the lenses 1, 2, formed as non-spherical or spherical surfaces, position relationships between the lens surfaces and outer rims 1a, 2a and so forth depend on the machining accuracy of the metal dies for molding, and on the casting conditions.

The lens holder 3 is formed to approximately a cylindrical shape by injection molding of epoxy resin, using silica (silicon dioxide) as a filler, as shown in FIGS. 5 to 10. To this lens holder 3 are fitted the first and second lenses 1, 2. The first and second lenses 1, 2, inserted in position in the lens holder 3, are secured with an adhesive, such as UV curable resin.

Figure 5:
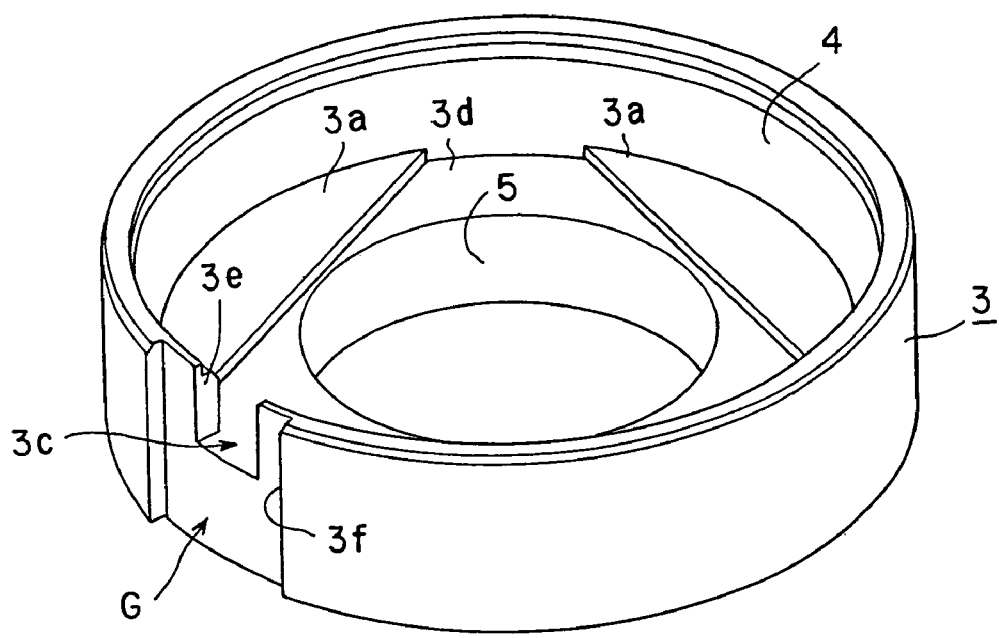
FIG. 5 is a perspective view of a lens holder forming the objective lens unit looking from a first lens fitting portion.
Figure 6:
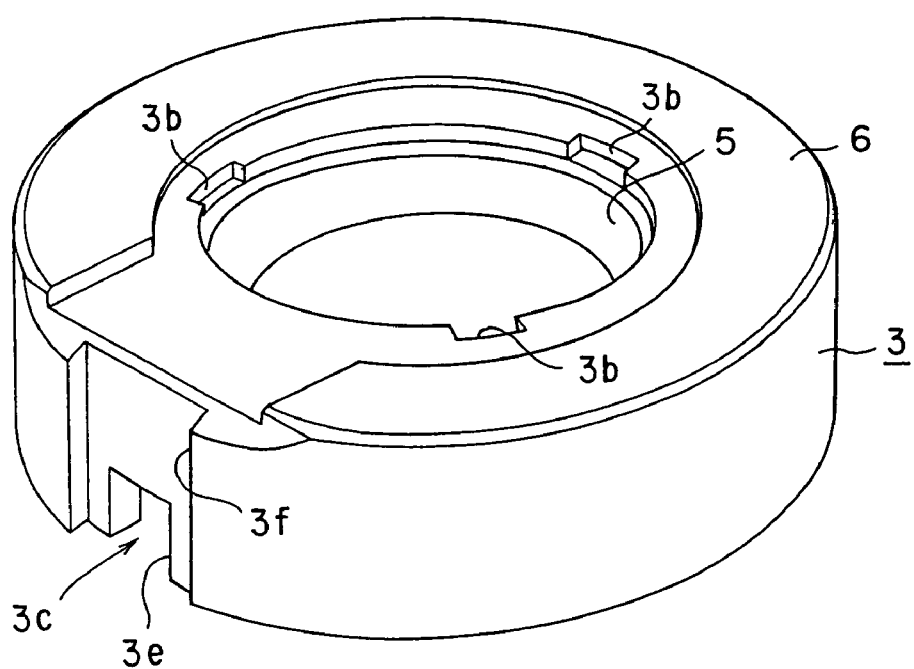
FIG. 6 is a perspective view of the lens holder forming the objective lens unit looking from a second lens fitting portion.

In this objective lens unit, the eccentricity of the lenses 1, 2 relative to the optical axis $P_1$, that is positions of the lenses in bi-axial directions, corresponding to directions within the planar surface perpendicular to the optical axis $P_1$, among the relative positions between the lenses 1, 2, are set by the outer diameters of the outer rims 1a, 2a of the lenses 1, 2, and by the inner diameter of the lens holder 3. That is, first and second lens fitting portions 4, 5 in which to insert the lenses 1, 2 and which control the eccentricities thereof are formed in inner sides of the lens holder 3, as shown in FIGS. 2 and 5.

Figure 11:
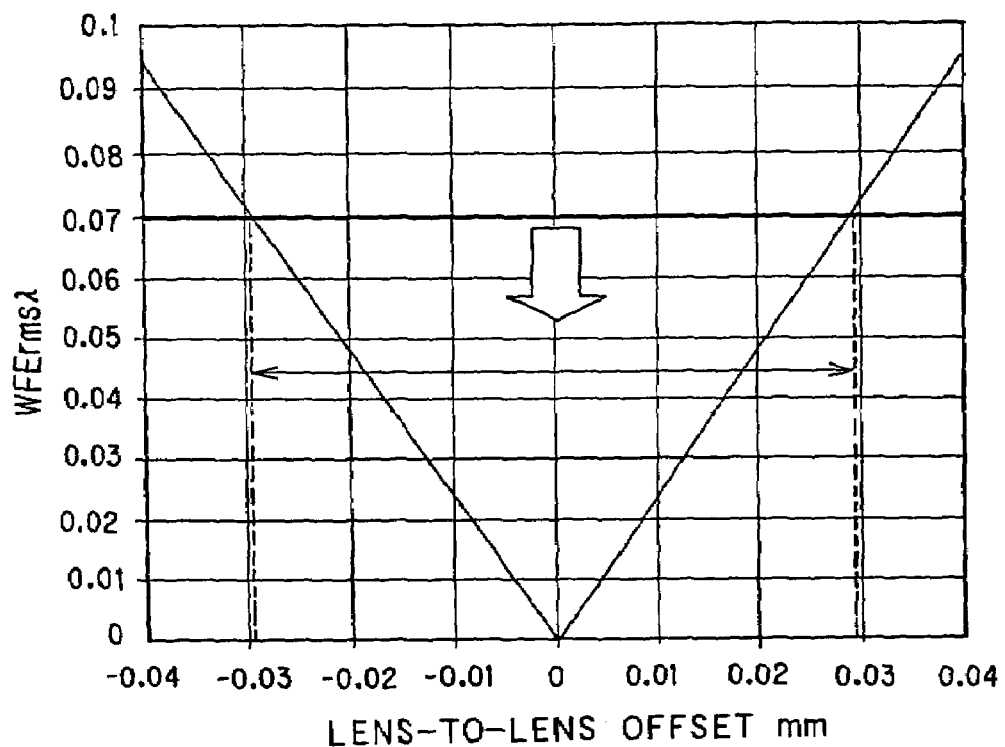
FIG. 11 is a graph showing the relation between the eccentricity between the lenses and the value of the wavefront aberration.

If, in the objective lens unit formed by combining the first and second lenses 1, 2, relative eccentricities are produced between the lens surfaces of the first and second lenses 1, 2, the aberration is increased to deteriorate the optical performance, as shown in FIG. 11.

It is noted that the relative eccentricities between the lens surfaces of the first and second lenses 1, 2 mean position offset in the planar direction perpendicular to the common optical axis of the lenses 1, 2, centered about this optical axis.

If, in an objective lens unit with an effective diameter of 3 mm and the numerical aperture NA of 0.85, the relative eccentricities between the lens surfaces of the first and second lenses 1, 2 exceed ±30 $\mu$m, the RMS value of the aberration exceeds the Marshall criteria threshold (wavefront aberration of 0.07 $\lambda$rms). That is, if, in an objective lens unit, formed by combining the first and second lenses 1, 2, the effective diameter is 3 mm, the numerical aperture NA is 0.85 and the working center wavelength is 405 nm, the lenses 1, 2 need to be secured to the lens holder 3 so that an error range of the coaxial degree of the lens surfaces of the respective lenses 1, 2 relative to the outer diameter of the lens holder 3 will be within 30 $\mu$m. The following factors may be surmised to be responsible for these relative eccentricities between the lens surfaces of the first and second lenses 1 and 2:

(1) The error in the coaxial degree between the outer peripheral surfaces of the outer rims 1a, 2a of the lenses 1, 2 and the lens surfaces;

(2) the error in the coaxial degree between the lens fitting portions 4, 5 of the lens holder 3; and (3) the clearance between the lens fitting portions 4, 5 and the outer rims 1a, 2a of the lenses 1, 2.

Since the accumulation of these three factors determines the amount of the eccentricities of the lens surfaces of the respective lenses 1, 2, it is essential that at least the coaxial degree of the lens surfaces of the respective lenses 1, 2 relative to the outer diameter of the lens holder 3 be within 30 $\mu$m.

That is, since the outer peripheral surfaces 1b, 2b of the outer rims 1a, 2a of the lenses 1, 2 are formed as one with the lens surfaces by glass mold casting employing a metal die, the coaxial degree between the outer peripheral surfaces 1b, 2b of the outer rims 1a, 2a and the lens surfaces depends on the machining accuracy of the metal die for casting and on the casting conditions. When the effective diameter of the objective lens is 3 mm, the outer peripheral surfaces 1b, 2b of the outer rims 1a, 2a and the lens surfaces are formed so as to have a coaxial degree with an error range within 30 $\mu$m.

Figure 12:
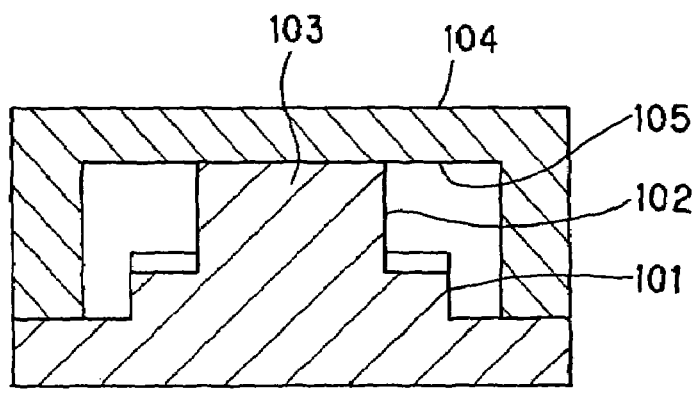
FIG. 12 is a longitudinal cross-sectional view showing a metal die for forming the lens holder.
Figure 13:
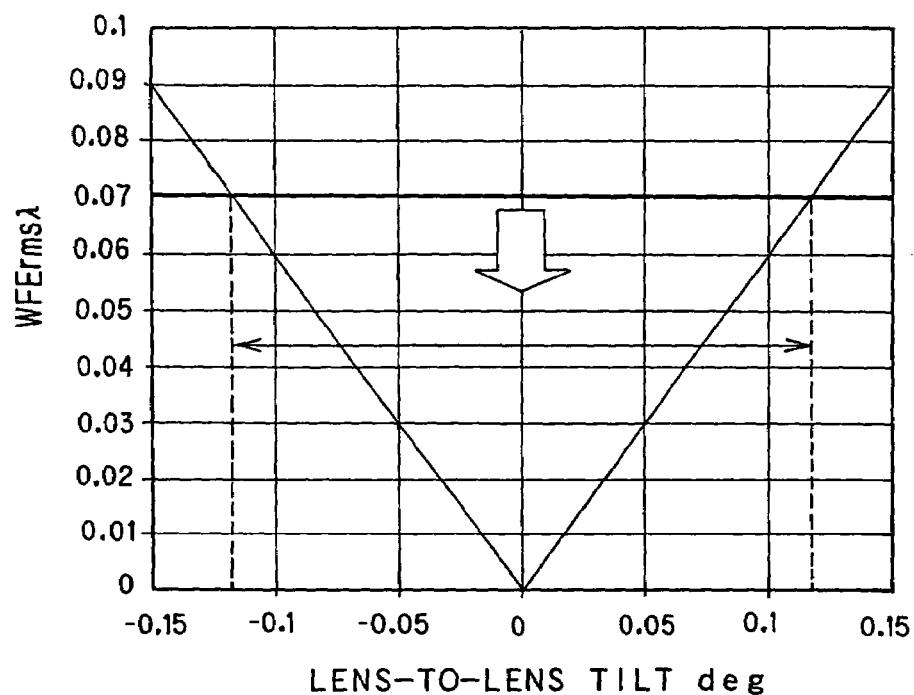
FIG. 13 is a graph showing the parallelism between the lenses and the value of the wavefront aberration.

A metal die for forming the lens holder 3 is comprised of a portion 101 for casting the first lens fitting portion 4 and a portion 102 for casting the second lens fitting portion 5, these portions 4, 5 being formed on the same convex die 103, as shown in FIG. 12. The metal die for forming the lens holder 3 is composed of the convex die 103 and a concave die 104 into which is inserted the convex die 103. In this metal die, as the convex die 103 is introduced into the concave die 104, the space defined between the convex die 103 and the concave die 104 serves as a cavity 105 into which the molten resin is introduced. The lens holder 3 is formed by the molten resin being charged into the cavity 105.

The portions 101, 102 for casting the first lens fitting portion 4 and the second lens fitting portion 5, respectively, provided to the convex die 103 used for forming the lens holder 3, are formed by concurrent machining on a lathe, that is by machining by the same chucking operation, so that the coaxial degree is maintained to high accuracy. In case the effective diameter of the objective lens unit is 3 mm and a light beam having a working center wavelength of 405 nm is to be condensed, the first lens fitting portion 4 of the lens holder 3 formed is formed so as to have a high coaxial degree, with an error range less than 30 $\mu$m, relative to the second lens fitting portion 5.

The first lens fitting portion 4, provided to the lens holder 3, is formed to have an inner diameter $R_1$ approximately equal to the outer diameter $R_2$ of the outer rim 1a of the first lens 1, as shown in FIG. 2. In case the effective diameter of the objective lens is 3 mm and the light beam with a working center wavelength of 405 nm is to be condensed, the inner diameter $R_1$ of the first lens fitting portion 4 is designed to suffer an error less than 30 $\mu$m with respect to the outer diameter $R_2$ of the outer rim 1a of the first lens 1. An inner diameter $R_3$ of the second lens fitting portion 5 is approximately equal to an outer diameter $R_4$ of the outer rim 2a of the second lens 2. It is noted that, in case the effective diameter of the objective lens unit is 3 mm and the light beam with a working center wavelength of 405 nm is to be condensed, the inner diameter $R_3$ of the second lens fitting portion 5 is designed to suffer an error less than 30 $\mu$m with respect to the outer diameter $R_4$ of the outer rim 2a of the first lens 2.

Figure 14:
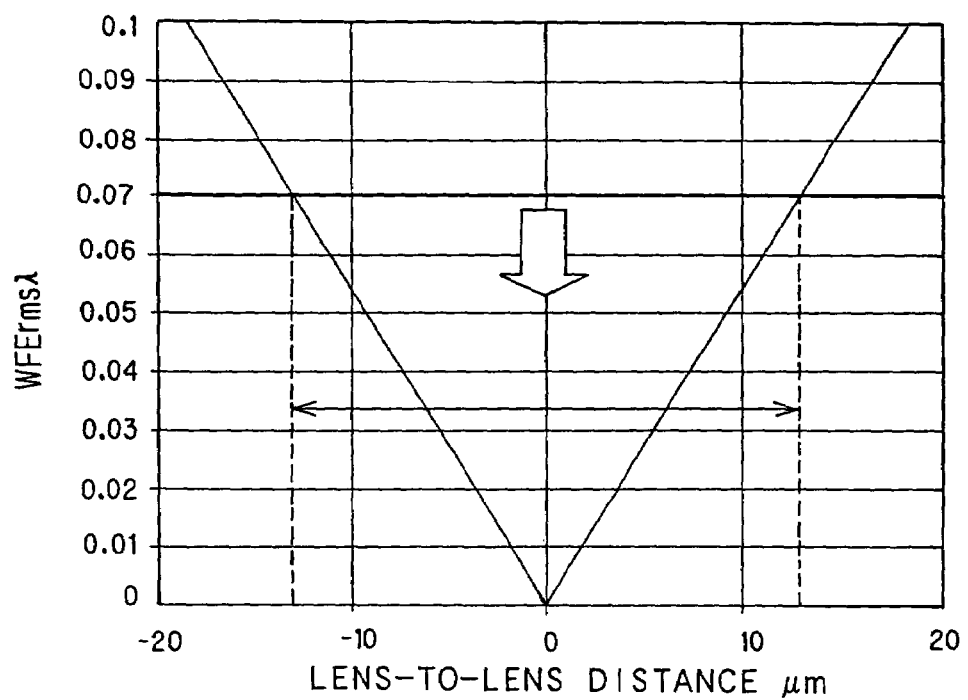
FIG. 14 is a graph showing the distance between the lenses and the value of the wavefront aberration.

If, in the objective lens unit according to the present invention, the parallelism between the two lenses 1 and 2 is deteriorated, the aberration is increased, thus lowering the optical properties, as shown in FIG. 14. If, in an objective lens unit with an effective diameter of 3 mm and with the numerical aperture NA of 0.85, the light beam with a working center wavelength of 405 nm is to be condensed, the RMS value of the aberration exceeds the Marshall criteria threshold (wavefront aberration of 0.07 λrms) in case the parallelism between the first and second lenses 1, 2 exceeds ±0.1 degree.

If, with the outer diameter of the lens of 2 mm, the parallelism between the first and second lenses 1, 2 is to be comprised in a range of ±0.1 degree, it is necessary to support the first and second lenses 1, 2 by the lens holder 3 within an error range of ±3.5 μm in accordance with the following equation:

2 [mm]×tan(±0.1 [deg])=±3.5 μm.

It is extremely difficult to form the lens holder 3, molded using the metal die, and which hold the first and second lenses 1, 2 with the parallelism within the above-mentioned error range to high reproducibility. Even if the lens holder 3 capable of holding the first and second lenses 1, 2 with such high accuracy could be formed, it is extremely difficult to put the first and second lenses 1, 2 and the lens holder 3 together without interposition of fine dust and dirt in-between under a working environment of assembling the objective lens unit. As a result, it is extremely difficult to mount the first and second lenses 1, 2 on the lens holder 3 with parallelism within the above-defined error range.

With the objective lens unit of the present invention, unless the distance between the first and second lenses 1, 2, put together as the optical axes $P_1$ of the lenses are coincident and as the parallelism within a preset error range is maintained, is kept within a preset range, the aberration is increased, while the optical characteristics are deteriorated, as shown in FIG. 14. If, with the effective diameter and the numerical aperture of the objective lens unit of 3 mm and 0.85, respectively, and with the light beam to be condensed thereby having a working center wavelength of 405 nm, an error in the distance between the first and second lenses 1, 2 exceeds ±13 μm, the RMS value of the aberration exceeds the limit of the Marshall criteria (wavefront aberration: 0.07 λrms).

It is extremely difficult to form the lens holder 3, capable of holding the first and second lenses 1, 2, forming the objective lens, with the distance therebetween of the above-defined error range, to high reproduceability, using a metal die.

It is extremely difficult to form the lens holder 3, capable of holding the objective lens unit, based solely on the casting accuracy in using a metal die device, as the optical axes $P_1$ of the first and second lenses 1, 2 are registered highly accurately, high degree of parallelism is maintained between the lenses 1, 2, and as the error in the distance between the lenses 1, 2 is maintained to be within a preset range.

With the objective lens unit of the present invention, the precision in the parallelism and the distance between the first and second lenses 1, 2 are guaranteed, using an assembling jig capable of adjusting the assembling accuracy, without being dependent on the precision in casting the lens holder 3.

Figure 15:
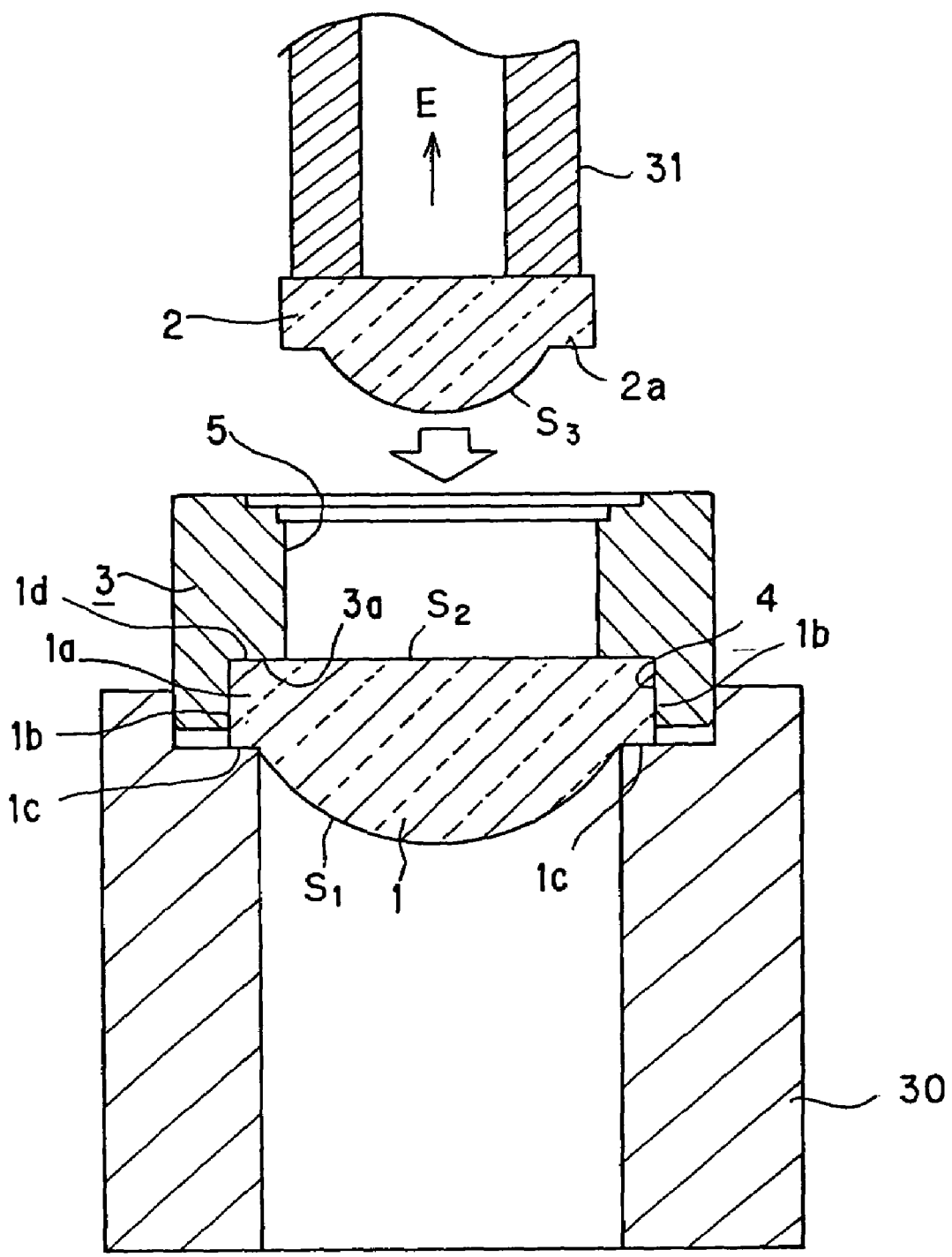
FIG. 15 is a longitudinal cross-sectional view showing the process of assembling the objective lens unit.

That is, in setting the relative positions of the first and second lenses 1, 2 forming the objective lens unit of the present invention, the first lens 1 is inserted into the first lens fitting portion 4 provided within the lens holder 3 and is immobilized using a UV curable resin. At this time, the first lens 1 is introduced into the first lens fitting portion 4 so that its first surface $S_1$ being convex with a large radius of curvature will be protruded from the lens holder 3, as shown in FIGS. 2 and 15. The first surface $S_1$ of the first lens 1 operates as an incident side for the light beam radiated from a light source when the objective lens unit is mounted on an optical pickup device.

The first lens 1, secured to the lens holder 3, is supported on a base block 30 of the jig. At this time, the first lens 1 is carried as its surface 1c towards the first surface of the outer rim 1a is placed on a supporting surface provided on the base block 30 of the jig.

The second lens 2, combined with the first lens 1 to form the objective lens unit of the present invention, is held by a holding jig 31, the relative position of which with respect to the base block 30 supporting the first lens 1 along with the lens holder 3 is maintained to high accuracy. The second lens 2 is introduced into the second lens fitting portion 5 of the lens holder 3, carried by the base block 30, as this holding jig 31 is moved towards the base block 30.

Meanwhile, the holding jig 31 is connected to an air suction device so as to hold the second lens 2 at its distal end by air suction in a direction indicated by arrow E in FIG. 15.

The second lens 2 is introduced into the second lens fitting portion 5 so that the lens surface being convex to a larger radius of curvature faces a second surface $S_2$ of the first lens 1 secured to the lens holder 3.

The convex surface of the second lens 2, facing the second surface $S_2$ of the first lens 1, forms a third surface $S_3$ of the objective lens unit.

The second lens 2, introduced into the second lens fitting portion 5, is positioned, with the first lens 1 secured to the first lens fitting portion 4 of the lens holder 3 as a reference, and is bonded to the lens holder 3, using an adhesive, such as a UV curable resin.

When the first lens 1 is secured to the lens holder 3, the position of the first lens 1 along its optical axis with respect to the lens holder 3 and the tilt of the first lens 1 with respect to the center axis of the lens holder 3 are controlled by an abutting surface 1d towards the second surface $S_2$ of the outer rim 1a compressing against a step 3a provided to the first lens fitting portion 4 formed on the lens holder 3.

An adhesive film with thickness on the order of 10 μm is interposed between the abutting surface 1d of the outer rim 1a of the first lens 1 and the step 3a within the lens holder 3, for securing the first lens 1 to the lens holder 3. As the adhesive, a UV curable resin, curable by illumination by the UV light, is used.

The objective lens unit according to the present invention is used for an optical pickup device adapted for writing or reading out information signals on or from an optical recording medium. When used in an optical pickup device, the objective lens unit of the present invention is arranged so that the first lens 1 and the second lens 2 will be located towards the light source radiating the light beam and towards an optical recording medium 110, respectively, as shown in FIGS. 1 and 2. Since the objective lens unit used in the optical pickup device is used for converging the light beam radiated from the light source on a signal recording surface 111 of the optical recording medium 110, the first and second lenses 1, 2 are combined so that the first surface $S_1$ and the third surface $S_3$, being convex to a larger radius of curvature, will be located towards the light source radiating the light beam.

In the objective lens unit of the present invention, the mounting position of the second lens 2 is set with the mounting position of the first lens 1 as reference. Thus, with the objective lens unit of the present invention, the second lens 2 is positioned with the surface 1c of the outer rim 1a of the first lens 1, on which falls a light beam $L_1$, as a reference surface, as shown in FIG. 2.

The second lens 2, secured to the lens holder 3 with the mounting position of the first lens 1, secured in position to the lens holder 3, as reference, is introduced into and carried by the second lens fitting portion 5 of the lens holder 3 and hence is such a state in which the eccentricity of the first lens 1 relative to the optical axis of the first lens is suppressed, that is in which the offset of the first lens 1 in a planar direction perpendicular to the optical axis is suppressed. When introduced into the second lens fitting portion 5, the second lens 2 is in such a state which, as the eccentricity thereof relative to the optical axis of the first lens 1 is suppressed, enables adjustment of the parallelism of the second lens 2 relative to the first lens 1, that is the tilt and the distance with respect to the optical axis.

Figure 16:
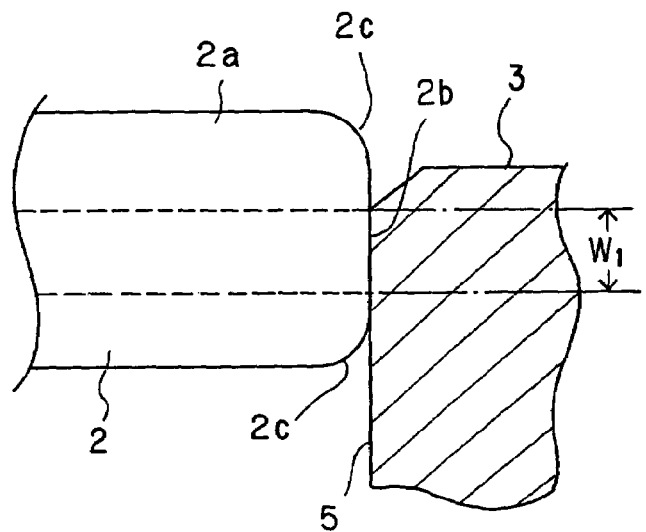
FIG. 16 is a schematic longitudinal cross-sectional view showing the state in which the second lens of the objective lens unit of the present invention has been introduced into the lens holder.

That is, when forming the second lens 2, the metal die is pressured in a direction along the thickness of the second lens 2, that is in a direction parallel to its optical axis. With the second lens 2, formed through this molding process, corner portions 2c, 2c on the outer peripheral side of the outer rim 2a, which the vitreous material reaches last during the casting process, present curved surfaces, whereas the portion in an outer peripheral surface 2b of the outer rim 2a which becomes a cylindrical surface parallel to the optical axis of the second lens 2 is only a portion with a width $W_1$ of approximately 100 μm at a mid portion along the direction of thickness, as shown in FIG. 16. The contact surface of the outer peripheral surface 2b of the outer rim 2a of the so formed second lens 2 with the inner peripheral surface of the second lens fitting portion 5 is only the ring-shaped portion of a width $W_1$ of the order of 100 μm. As a result, the second lens 2, inserted into the second lens fitting portion 5, can be rotated in a direction perpendicular to the optical axis about a ring-like portion of the width $W_1$ of the order of 100 μm, contacted with the inner peripheral surface of the second lens fitting portion 5, as the center of rotation. Additionally, the second lens 2 can be moved in a direction along the optical axis within the second lens fitting portion 5.

Figure 17:
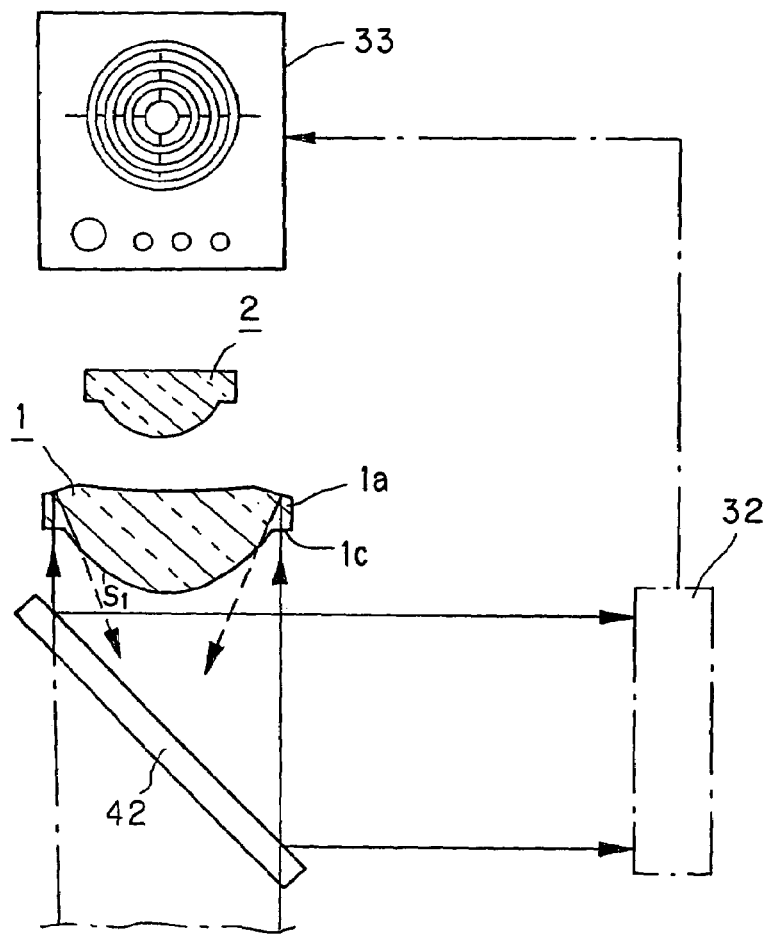
FIG. 17 is a longitudinal cross-sectional view showing an objective lens unit mounted on an objective lens manufacturing device according to the present invention.

In an objective lens unit manufacturing device according to the present invention, as later explained, detection of the tilt of an optical axis of the first lens 1 relative to the reference surface of the device is by illuminating the laser light to a reference surface 1c of an outer rim 1a of the first objective lens 1, on which is incident the light beam $L_1$, by reflecting the light reflected back from the reference surface 1c of the first lens 1 by a mirror 42, so that the light will be incident on detection means, such as a first CCD (imaging device) 32, and by inputting an output detected by the CCd 32 to the first monitor 33, as shown in FIG. 17.

Figure 18:
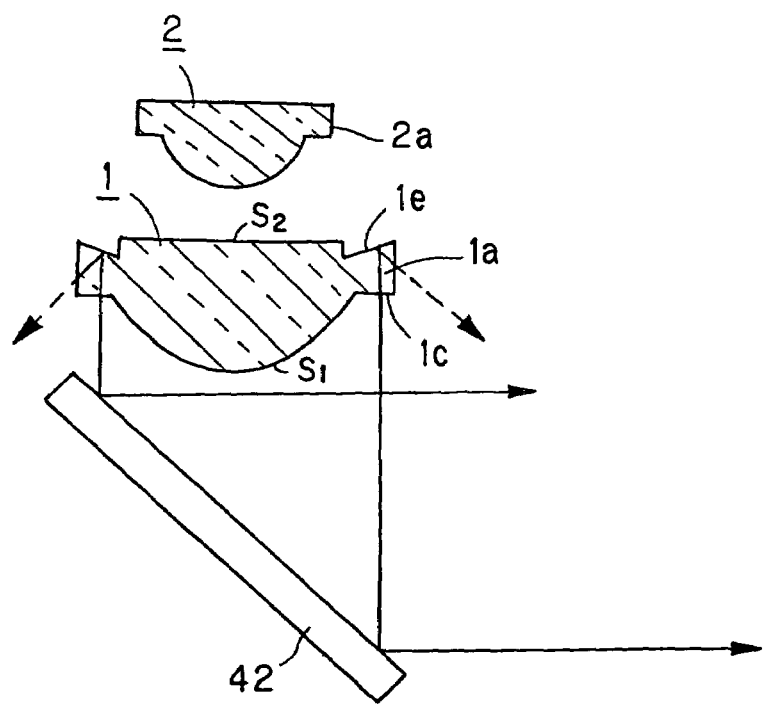
FIG. 18 is a longitudinal cross-sectional view showing another objective lens unit mounted on an objective lens manufacturing device according to the present invention.

The surface 1e on the outer rim 1a of the first lens 1, positioned towards the optical recording medium 110, is formed as a surface inclined towards the outer rim, as shown in FIG. 18. That is, since the surface 1e of the outer rim 1a of the first lens 1 positioned towards the optical recording medium 110 is formed as an inclined surface, the outer rim of which is proximate to the reference surface 1c, a portion of the laser light illuminated on the reference surface 1c and transmitted through this reference surface 1c proceeds as indicated by a broke line in FIG. 18, without reaching the first CCD 32, even if the light is reflected by the surface 1e lying towards the optical recording medium 110, thus assuring optimum detection of the tilt of the first lens 1.

Figure 20:
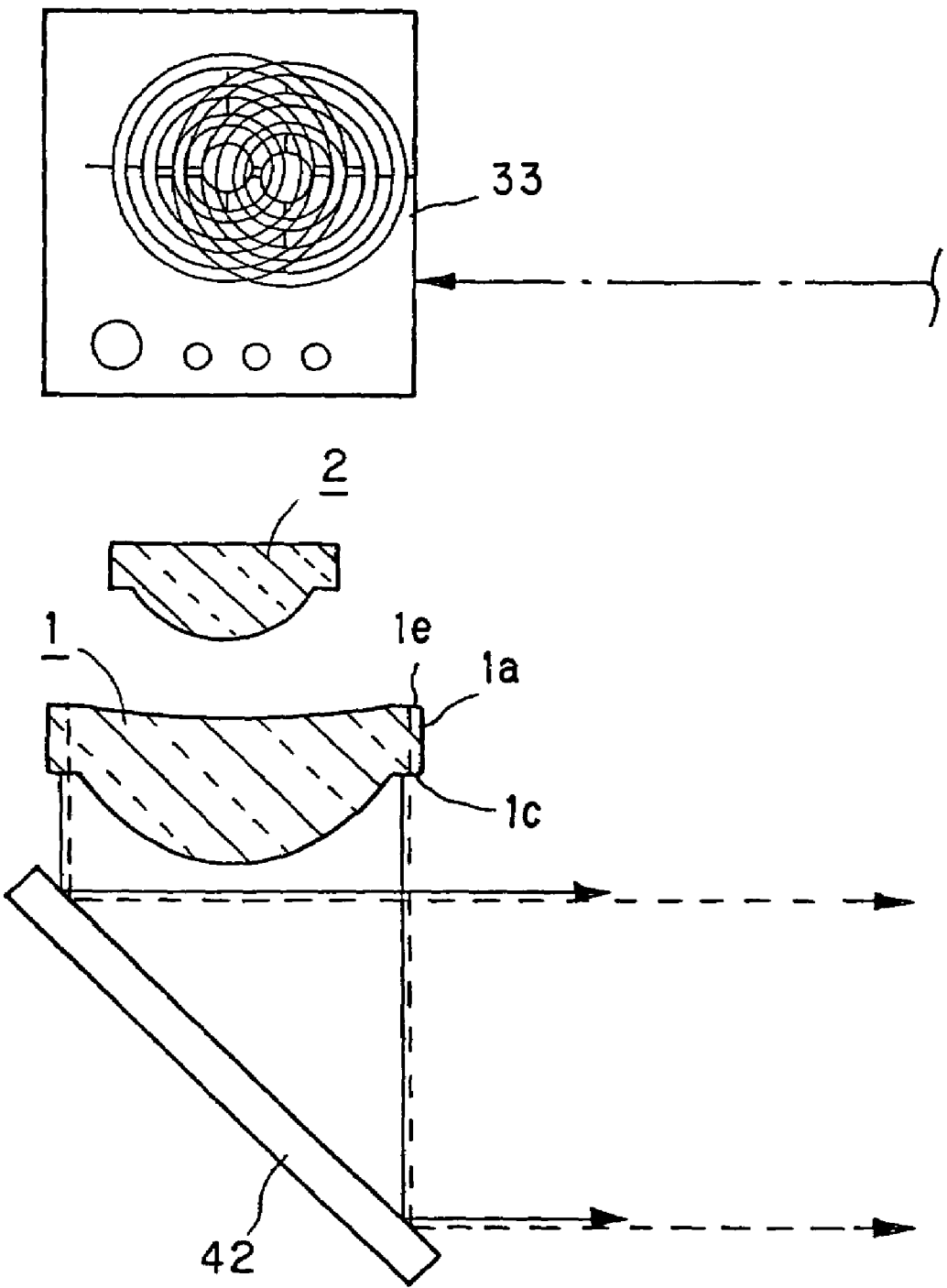
FIG. 20 is a longitudinal cross-sectional view showing a conventional objective lens unit mounted on an objective lens manufacturing device according to the present invention.

That is, if the surface 1e of the outer rim 1a of the first lens 1, lying towards the optical recording medium 110, is not inclined, as shown in FIG. 20, but is formed as a surface parallel to the reference surface 1b, a portion of the laser light illuminated on the reference surface 1c may be transmitted through the reference surface 1c to reach the surface 1e parallel to the reference surface 1c so as to be then reflected by this surface 1e to proceed as indicated by a broken line in FIG. 20 to get to the first CCD 32 after reflection by the mirror 42. If the light reflected by the reference surface 1c and the light reflected by the surface 1e towards the optical recording medium 110 reach the first CCD 32 in a mixed state, the two light beams undergo interference to prove to be a noise against detection of tilt of the first lens 1. There is also the risk that multiple reflection be produced between the reference surface 1c and the surface 1e towards the optical recording medium 110 to render it impossible to detect the tilt of the first lens 1 satisfactorily.

On the other hand, the surface 1e of the outer rim 1a of the first lens 1 towards the optical recording medium 110 may be formed as an inclined surface recessed from the outer rim side of the outer rim 1a towards the center of the lens 1, as shown in FIG. 18. In this case, the light reflected by the surface 1e towards the optical recording medium 110 facing the reference surface 1c is reflected from the center towards the outer rim of the first lens 1, as indicated by a broken line in FIG. 18, thus reliably prohibiting the light reflected back from the surface 1e from falling on the first CCD 32.

Figure 19:
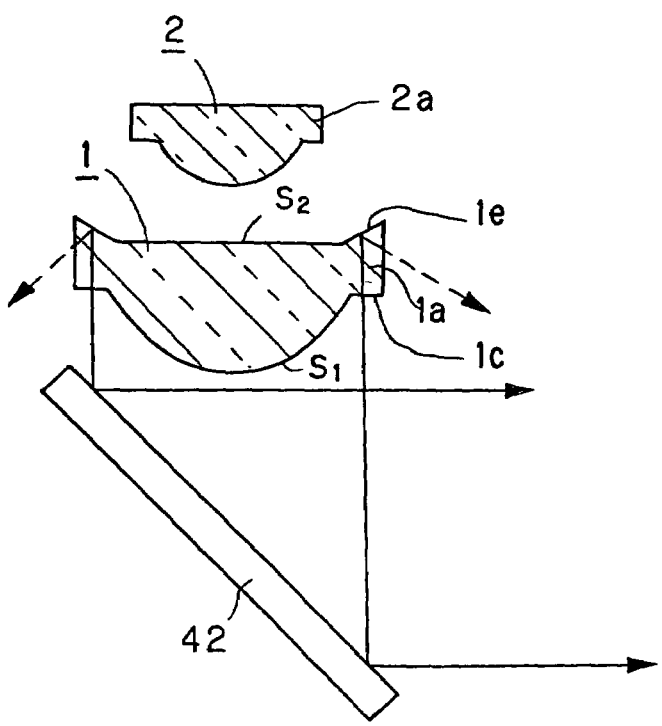
FIG. 19 is a longitudinal cross-sectional view showing still another objective lens unit mounted on an objective lens manufacturing device according to the present invention.

The surface 1e of the outer rim 1a of the first lens 1 may also be formed as an inclined surface which is recessed from the outer rim side of the outer rim 1a towards the center of the lens 1, and which also smoothly merges to the second surface $S_2$ of the first lens 1, as shown in FIG. 19.

Moreover, for preventing the light reflected back form the surface towards the optical recording medium 110 of the outer rim 1a of the first lens 1 from falling on the first CCD 32, an AR coat (anti-reflection film) may be provided on this surface 1e to inhibit reflection of the laser light incident on ths surface 1e.

When the objective lens of the present invention is used in an optical pickup device for writing or reading out information signals for an optical recording medium, such as an optical disc, it is necessary for the normal operation to be guaranteed in a range of a temperature environment from sub-freezing point to 60 C. or higher. If the temperature environment is changed throughout this range, the air present in the space formed between the first and second lenses 1, 2, inserted into and carried by the lens holder 3, is changed appreciably in density.

The air present in the hermetically sealed space between the first and second lenses 1, 2 is changed appreciably in pneumatic pressure due to changes in the temperature environment. That is, if the temperature rises, the pneumatic pressure between the lenses 1 and 2 is larger than the atmospheric pressure, thus producing the pressure which tends to separate the lenses 1 and 2 away from each other. If conversely the temperature falls, the pneumatic pressure between the lenses 1 and 2 is smaller than the atmospheric pressure, thus producing a pressure which tends to cause the lenses 1 and 2 to approach to each other.

Figure 7:
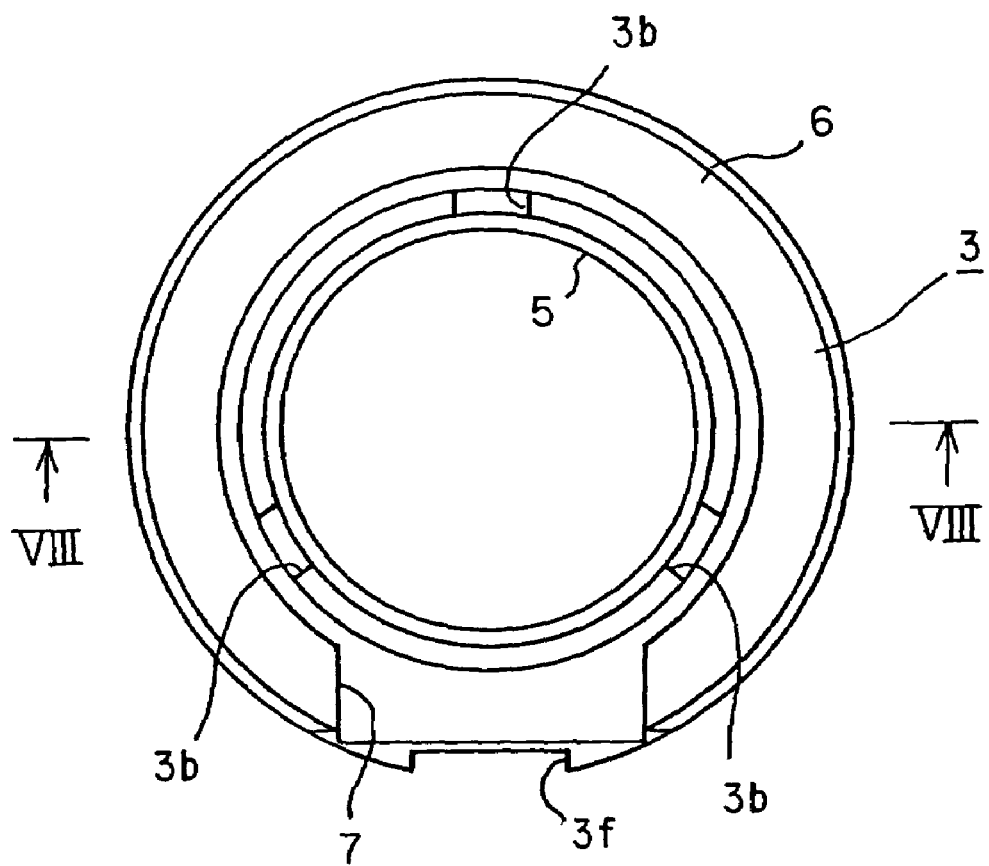
FIG. 7 is a plan view showing a lens holder forming the objective lens unit of the present invention.
Figure 8:
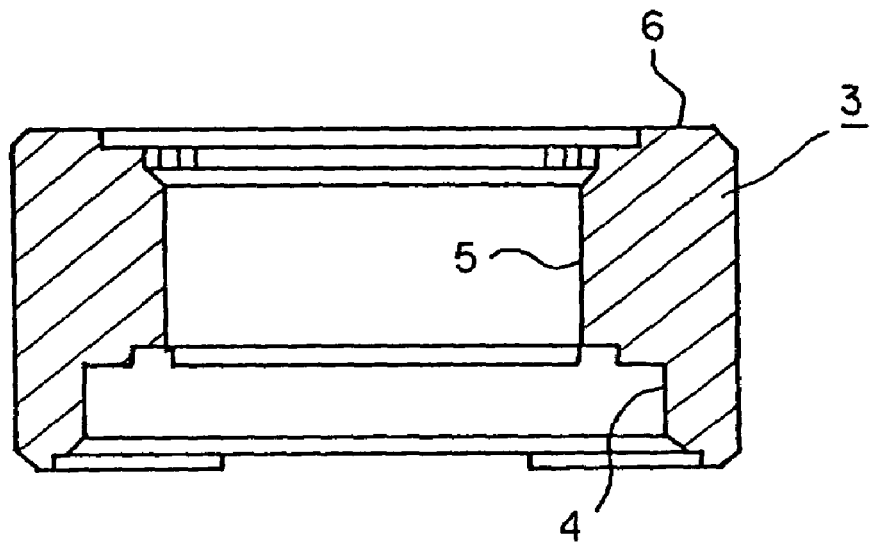
FIG. 8 is a cross-sectional view taken along line VIII—VIII of FIG. 7.
Figure 9:
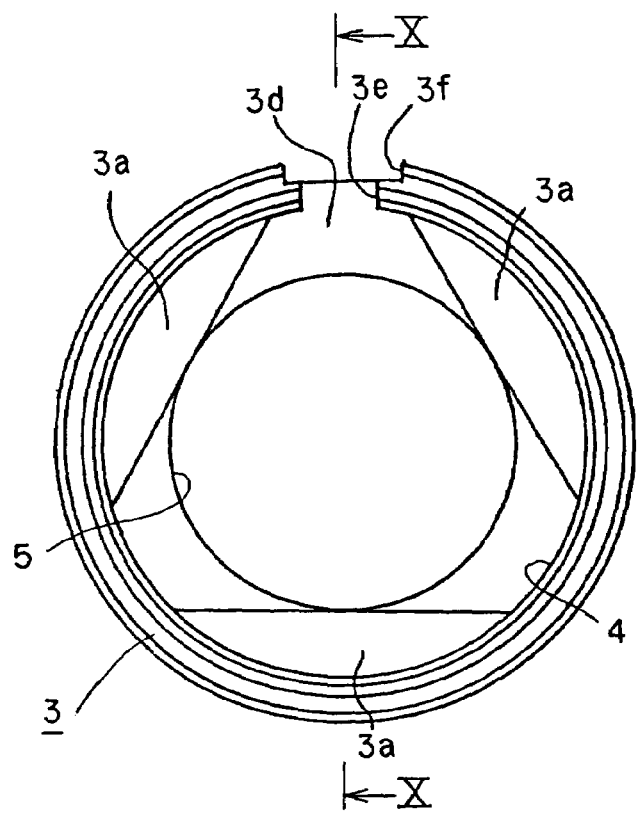
FIG. 9 is a bottom plan view showing the lens holder forming the objective lens unit of the present invention.
Figure 10:
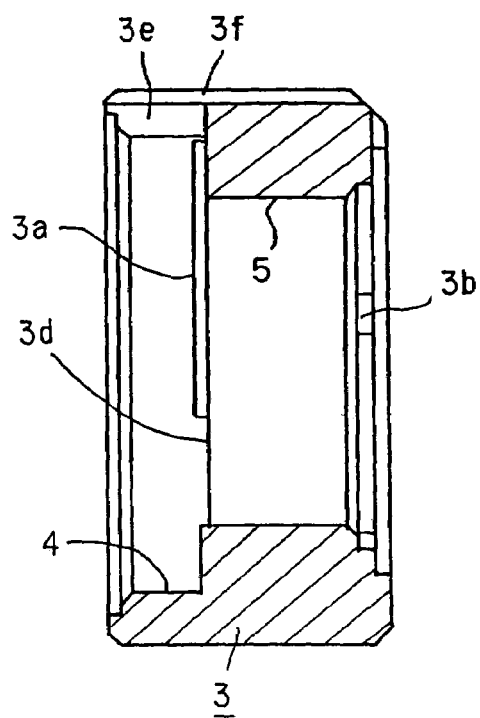
FIG. 10 is a cross-sectional view taken along line X—X of FIG. 9.

Meanwhile, the first lens 1 has an abutment surface 1d, lying towards the second surface $S_2$ of the outer rim 1a, bonded to the step 3a of the first lens fitting portion 4 with a UV curable resin. The second lens 2, on the other hand, is bonded in position with an adhesive, charged into three recessed adhesive coating portions 3b, formed by cutting out portions of the inner rim of the second lens fitting portion 5, as shown in FIGS. 4 and 7.

Since the first and second lenses 1, 2 are secured to the lens holder 3 with an adhesive, as described above, the adhesive securing the first and second lenses 1, 2 to the lens holder 3, in particular the adhesive securing the second lens 2 to the lens holder 3, is subjected to a stress, due to repeated changes in temperature, representing a so-called heat cycle, thus producing irreversible variations in the distance and tilt of the lens to give rise to deteriorated optical aberration characteristics.

Assuming that the space between the first and second lenses 1, 2, carried by the lens holder 3, is a hermetically sealed space, the air present in the space between the first and second lenses 1, 2 is pressurized, when the second lens 2 is inserted into the lens holder 3 after mounting the first lens 1 on the lens holder 3, with the result that the pressure acting to separate the lenses 1, 2 away from each other is present at all times between the lenses 1 and 2.

Thus, with the objective lens unit of the present invention, an air vent 3c is provided in the lens holder 3, as shown in FIGS. 3 and 5, such that the space between the first and second lenses 1, 2 is a space communicating with an outer side of the lens holder 3. This air vent 3c is formed by forming a recess 3d in a portion of the step 3a, compressing against the abutment surface 1d of the outer rim 1a of the first lens 1, so that the recess 3d is not contacted with the abutment surface 1d of the outer rim 1a, and by forming a cut-out 3e for establishing communication between the recess 3d with the outer peripheral surface of the lens holder 3, as shown in FIG. 5.

By forming the air vent 3c in the lens holder 3, the space between the first and second lenses 1, 2 does not prove a hermetically sealed space, while air in this space is not subjected to changes in the pneumatic pressure, even if the density is changed with changes in temperature, so that no pressure is applied to the lenses 1, 2, and hence no deterioration in optical aberration characteristics is produced despite occurrence of repeated changes in temperature.

Since the space between the first and second lenses 1, 2 does not prove to be a hermetically sealed space, there is no risk of air present in the space between the first and second lenses 1, 2 becoming compressed and pressurized on insertion of the second lens 2 into the lens holder 3 after mounting the first lens 1 to the lens holder 3.

For providing the recess 3d in a portion of the step 3a of the lens holder 3, the portion of the convex die 103 for forming the lens holder 3, which is destined to form the recess 3d, is removed by cutting to produce the step 3a.

On the other hand, a gate G, provided for charging molten resin into a metal die in injection molding the lens holder 3, is provided in a groove 3f formed in the outer peripheral surface of the lens holder 3 in register with a cut-out 3e forming the air vent 3c, as shown in FIG. 5.

When the objective lens of the present invention is used in an optical pickup device for writing or reading out information signals for an optical recording medium, it is necessary for the normal operation to be guaranteed in a range of a temperature environment from sub-freezing point to 60° C. or higher. If the temperature environment is changed throughout this range, the distance between the first and second lenses 1, 2 is changed due to thermal expansion or contraction of the lens holder 3 itself.

If, with the effective diameter of 3 mm, the working center frequency of 405 nm and the numerical aperture of 0.85, the distance between the first and second lenses 1, 2 is subjected to an error within 13 μm, and the linear expansion coefficient of the material forming the lens holder 3 is a, the following relationship:

$$\alpha \times \Delta t \times L < 13 \times 10^{-3} \text{ (mm)}$$

is derived.

Here, Δt (temperature change) and L (length of the lens holder) are set as follows:

$$\Delta t = 60/2 = 30(° \text{C.}) \text{ and}$$

$$L = 2 \text{ (mm).}$$

From these conditions, the following condition for the linear expansion coefficient α of the material making up the lens holder 3:

$$\alpha < 2 \times 10^{-4}$$

is derived.

Meanwhile, if an epoxy resin, having silica (silicon dioxide) as a filler, is selected as the material forming the lens holder 3, the linear expansion coefficient can be suppressed to a value on the order of $1 \times 10^{-5}$.

The objective lens unit of a double-lens set, made up by two lenses, with the numerical aperture (NA) of not less than 0.7, has a working distance (the physical distance between the surface of the optical recording medium and the end face of the objective lens) smaller than that of a single objective lens used in a conventional optical pickup device. In the optical pickup device, the objective lens position is controlled by focusing servo in such a manner that the distance between the surface of the optical recording medium and the end face of the objective lens will at all times be a preset working distance. The focusing servo, in turn, controls the light beam, converged by the objective lens, so that the light beam, converged by the objective lens, will be focussed on the signal recording surface of the optical recording medium. For example, if disturbances, such as external shock, is applied to the optical pickup device, the objective lens unit may become offset from its design position. If, in this case, the working distance is long, the probability of collision between the optical recording medium and the objective lens unit is low. However, if the working distance is short, the probability of collision between the rim and the objective lens unit becomes higher.

If, when the collision occurs between the optical recording medium and the objective lens unit, the surface of the optical recording medium is directly contacted with the lens surface of the objective lens unit, these surfaces are damaged to deteriorate recording and/or reproducing characteristics.

Figure 21:
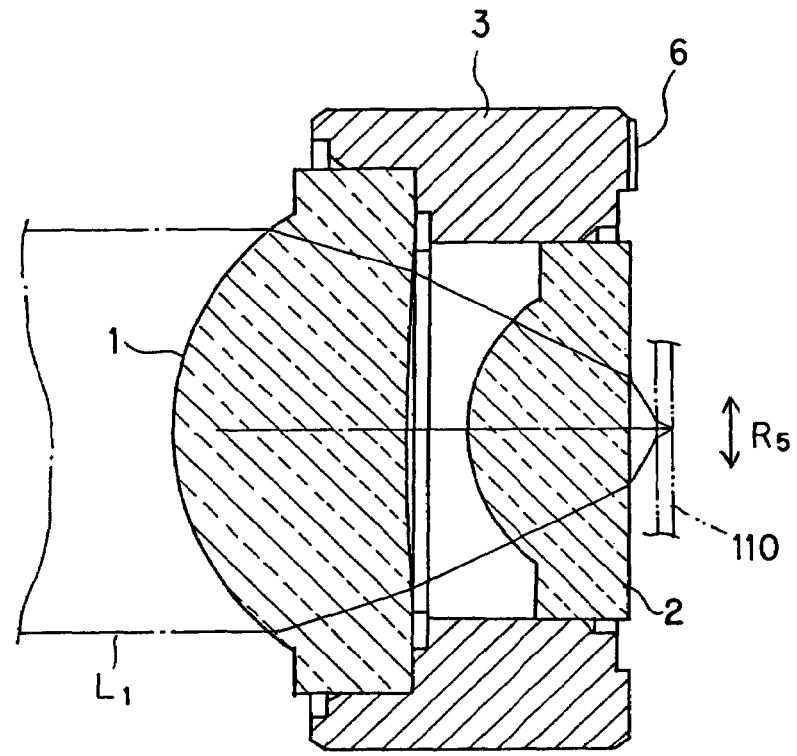
FIG. 21 is a longitudinal cross-sectional view showing an objective lens unit in which a lens holder is provided with a protector.

With the objective lens unit of the present invention, a protector 6 is mounted on one end face of the lens holder 3 for encircling the outer periphery of the second lens 2, in order not to damage the surface of the optical recording medium or the lens surface of the objective lens unit, as shown in FIGS. 20 and 21. The protector 6 is formed by for example a film of fluorine resin exhibiting elasticity and is provided for being protruded closer to the optical recording medium 110 than the lens surface of the second lens 2 lying closest to the optical recording medium, as shown in FIG. 20. The protector 6 helps prevent direct contact of the surface of the optical recording medium 110 with the lens surface of the objective lens unit, while buffering the force of impact caused by collision between the optical recording medium 110 and the objective lens unit. Moreover, since the protector 6 has an only small frictional coefficient against the surface of the optical recording medium, it is also possible to avoid scorching.

If this protector 6 is provided as described above and should collide against the surface of the optical recording medium 110, the protector 6 operates effectively to prevent the surface of the optical recording medium 110 from being damaged. However, the fluorine resin or the like material, forming the protector 6, is exfoliated. Such debris 6a from the protector 6 becomes accumulated on the lens surface of the second lens 2. If the debris 6a is accumulated within an area of the lens surface of the second lens 2 traversed by the light beam, the light path of the light beam is interrupted to lower the transmission ratio, while affecting optical characteristics, such as optical spatial frequency.

Figure 22:
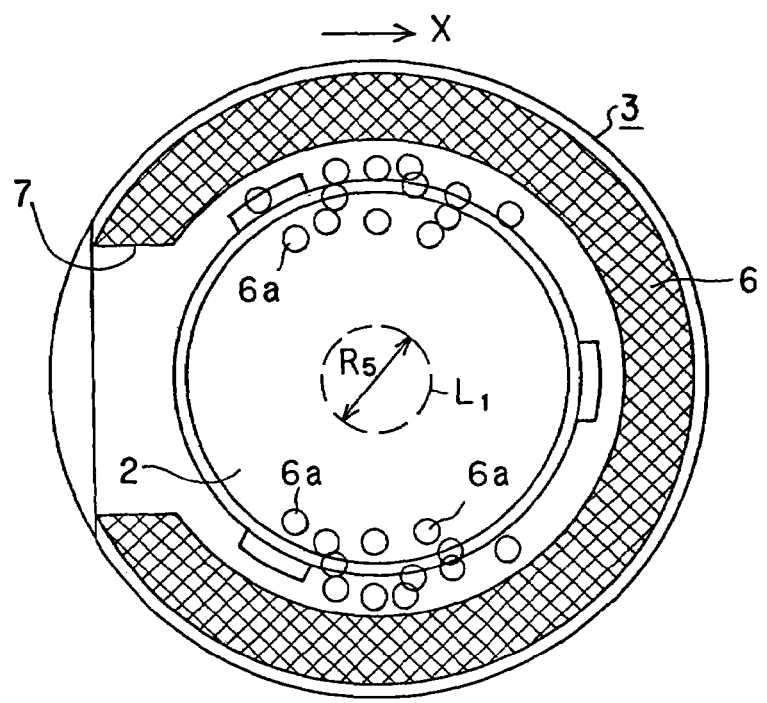
FIG. 22 is a plan view thereof.

Meanwhile, the debris 6a, produced on exfoliation from the protector 6, is migrated along the direction of relative movement of the optical recording medium 110 with respect to the objective lens unit, that is along the tangential direction of the optical recording medium 110, as indicated by arrow X in FIG. 22.

Thus, in the objective lens unit of the present invention, the protector 6 is formed as one with a cut-out 7 larger in breadth than the diameter $R_5$ of the light beam L1 on the lens surface of the second lens 2, as shown in FIG. 21. In use, this objective lens unit is mounted so that the cut-out 7 is on the path of relative movement of the optical recording medium 110 with respect to the objective lens unit.

Referring to the drawings, an objective lens unit manufacturing device, according to the present invention, used for manufacturing the above-described objective lens unit, is now explained.

Figure 23:
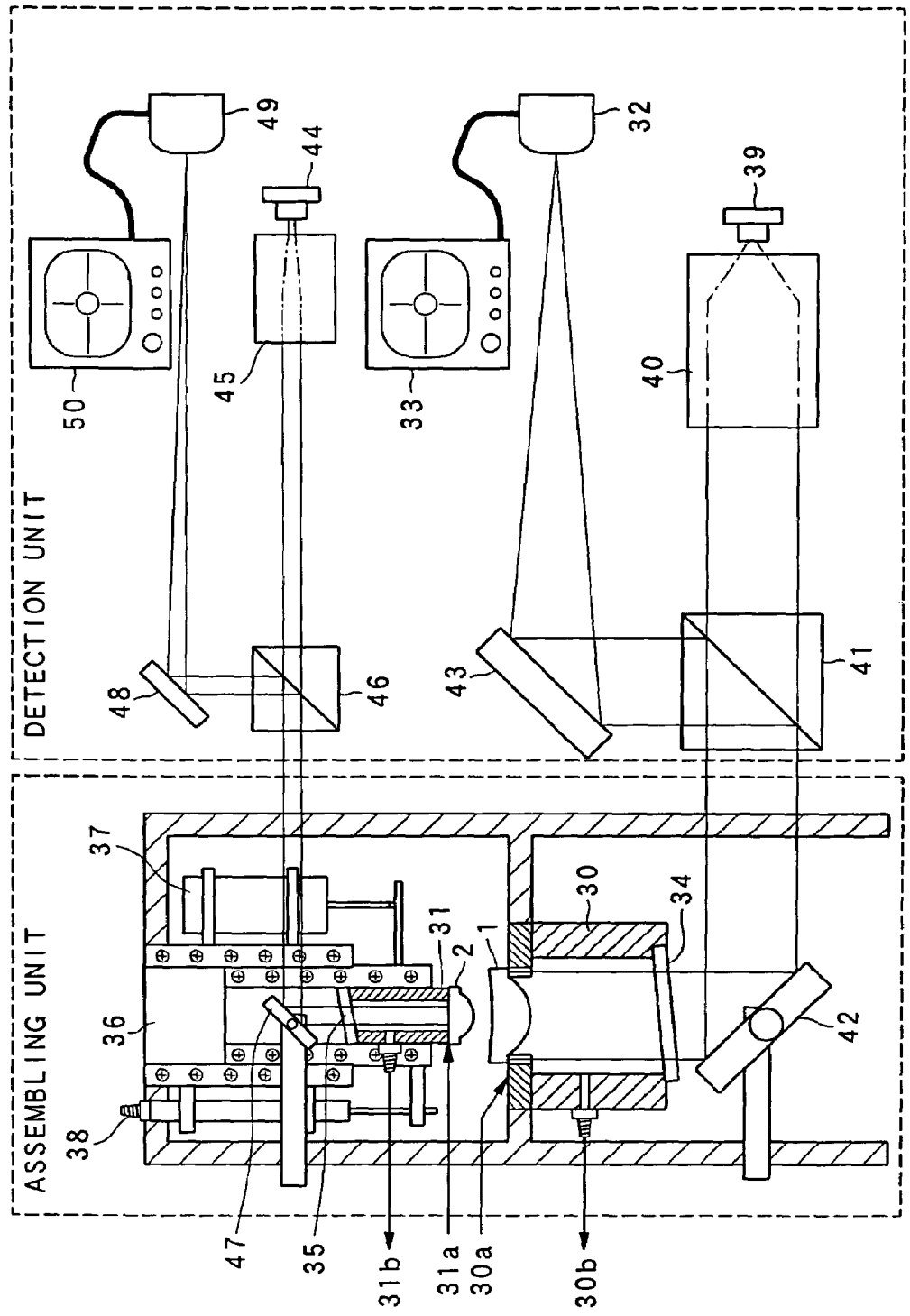
FIG. 23 is a side view showing a structure of an objective lens manufacturing device according to the present invention, with a portion thereof being broken away.

Referring to FIG. 23. The objective lens unit manufacturing device of the present invention includes an assembling unit for positioning and assembling first and second lenses 1, 2 to a lens holder 3, and a detection unit for monitoring the parallelism of the lens surfaces of the first and second lenses 1 and 2 and the outer rims 1a and 2a.

The assembling unit includes a base unit 30, having a device reference surface 30a, on which to set the first lens 1, and a holding unit 31, having a device reference surface 31a on which to set the second lens 2 in position. The device reference surface 30a, as an upper surface of the base unit 30, is adjusted so as to be precisely normal to the optical axis of the first lens 1 placed thereon.

This base unit 30 is substantially cylindrically-shaped, with an inner spacing, such that, by placing the outer rim 1a of the first lens 1 on the device reference surface 30a and by extracting the inner air via suction bore 30b to outside, the first lens 1 may be held in position by the air pressure differential across its inner and outer sides. At this time, the upper end of the base unit 30 is closed by the first lens 1. A glass cover for hermetically sealing the inner spacing is mounted to the upper end of the base unit 30. The glass cover 34 is inclined with respect to the device reference surface 30a on the upper end to reflect e.g., the laser light illuminated on the outer rim 1a of the first lens 1 so as not to produce stray light.

The holding unit 31 is substantially cylindrically-shaped to delimit an inner spacing, and is adapted for holding the second lens 2 under an air pressure differential across its inner side and the outer side produced on evacuating the inner area through a suction port 31b to outside with the outer rim 2a of the second lens 2 abutting against the device reference surface 31a at the lower end of the unit. At this time, the lower end of the holding unit 31 is closed by the second lens unit 2. The upper end of the holding unit 31 is fitted with a glass cover 35 for hermetically sealing an inner spacing. The glass cover 35 is inclined with respect to the device reference surface 31a at the lower end of the unit so as not to produce the stray light caused by reflection of for example the laser light illuminated on the second lens 2.

The holding unit 31 is supported by a so-called cross roll bearing, that is a uni-axial movement stage 36, and is movable along the optical axes of the first and second lenses 1 and 2. The amount of movement of this holding unit 31 may be detected by for example a magnetic length measurement device 37. The holding unit 31 is moved by a driving power source 38, such as a pneumatic cylinder, a linear motor or a stepping motor.

The parallelism of the outer rim 1a of the first lens 1, set on the device reference surface 30a of the base unit 30, with respect to the device reference surface 30a, may be detected by a detection system provided with a first laser light source 39. As the first laser light source 39, any suitable monochromatic light source, such as a gas laser or a solid laser, may be used in addition to a semiconductor laser.

The light beam radiated from the first laser light source 39 is turned into collimated light, with an enlarged beam diameter, by a collimator lens and a beam expander 40. The light beam, now turned into the collimated light, is transmitted through a beam splitter 41, a mirror 42 and a glass cover 34 at the lower end of the base unit 30 so as to fall on the upper end of the base unit 30. If the first lens 1 is set on the device reference surface 30a at the upper end of the base unit 30, this collimated light is reflected by the reference surface 1b of the outer rim 1a of the first lens 1 and thence returned through the glass cover 34 and the mirror 42 to the beam splitter 41.

Figure 24:
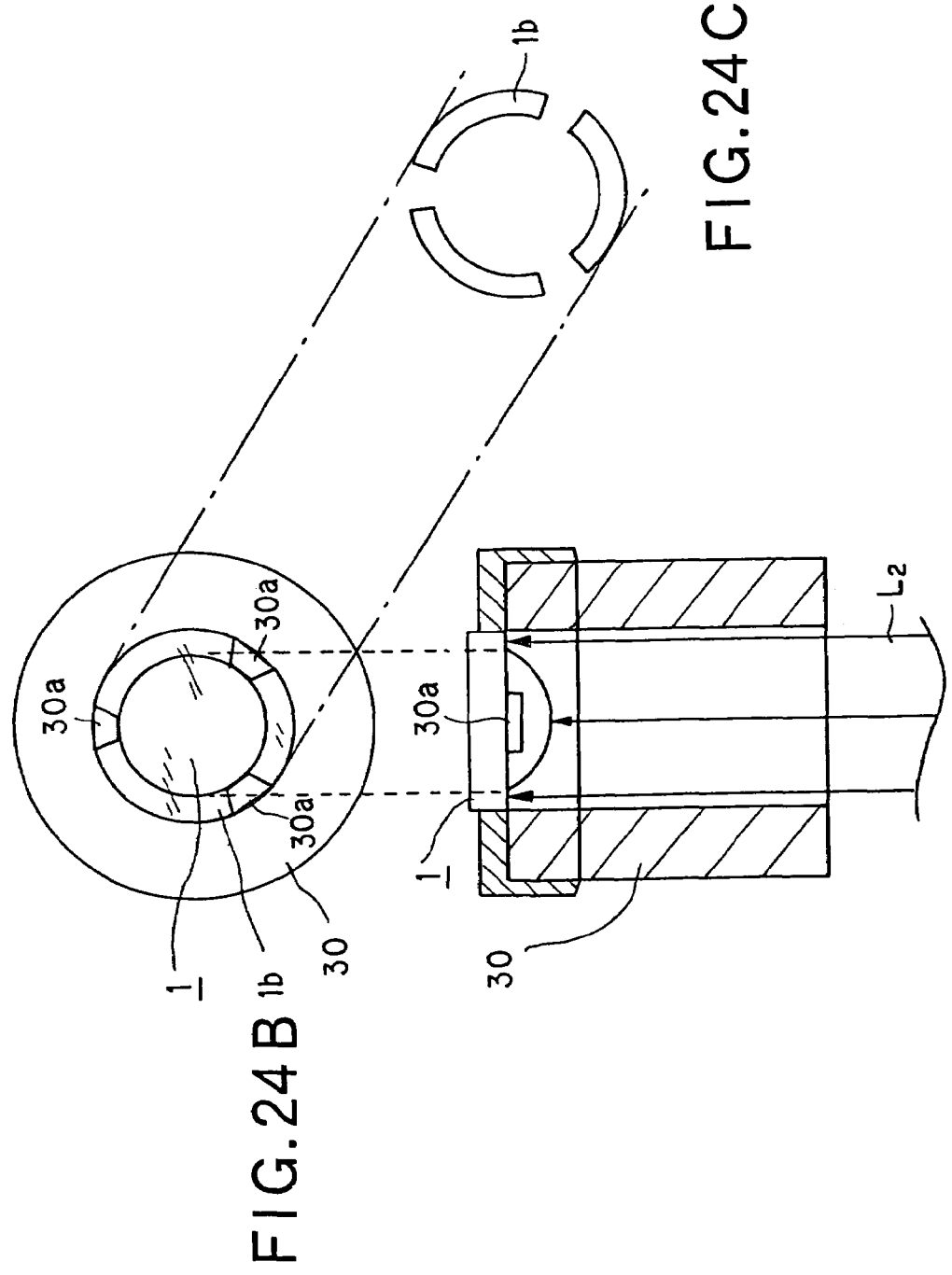
FIG. 24A is a plan view showing the shape of a device reference plane for positioning the first lens in the objective lens manufacturing device according to the present invention.
FIG. 24B is a longitudinal cross-sectional view thereof and FIG. 24C is a plan view showing a reference plane of the first lens.

Meanwhile, the device reference surface 30a at the upper end of the base unit 30 does not cover the entire surface of the reference surface 1b of the outer rim 1a of the first lens 1 but compresses against only a portion of the reference surface 1b at for example three places to cover only the portions in question, as shown in FIGS. 24A to 24C. Thus, the laser light $L_2$, oncoming from the lower end of the base unit 30, is incident on and reflected from the portion of the reference surface 1b of the outer rim 1a of the first lens 1 which is not covered by the device reference surface 30a at the upper end of the base unit 30, as shown in FIG. 24C.

The return light from the reference surface 1b of the outer rim 1a of the first lens 1 is reflected back from the reflecting surface of the beam splitter 41 and branched from the return optical path to the first laser light source 39 to fall through mirror 43 on the first CCD 32 operating as detection means. The image picked up by the first CCD 32 is displayed on the first monitor 33. The collimating of the light beam from the first laser light source 39 is adjusted on the imaging surface of the first CCD 32 so that the beam diameter will be minimized.

The parallelism of the outer rim 2a of the second lens 2, held by suction by the device reference surface 31a of the holding unit 31, is detected by a detection system having a second laser light source 44. As the second laser light source 44, any suitable monochromatic light source, such as a gas laser or a solid laser, may be used in addition to a semiconductor laser.

The light beam radiated from the second laser light source 44 is turned into collimated light, with an enlarged beam diameter, by a collimator lens and a beam expander 45. The light beam, now turned into the collimated light, is transmitted through a beam splitter 46, a mirror 47 and the glass cover 35 at the upper end of the holding unit 31 so as to fall on the lower end of the holding unit 31. If the first lens is held on the device reference surface 31a at the lower end of the holding unit 31, this collimated light is reflected by the reference surface 1b of the outer rim 1a of the first lens 1 and thence returned through the glass cover 3 and the mirror 47 to the beam splitter 46. The return light is reflected back from the reflecting surface of the beam splitter 46 and branched from the return optical path to the second laser light source 44 to fall through mirror 48 on the second CCD 49 operating as detection means. The image picked up by the second CCD 49 is displayed on the second monitor 50. The collimating of the light beam from the second laser light source 44 is adjusted on the imaging surface of the second CCD 49 so that the beam diameter will be minimized.

Figure 25:
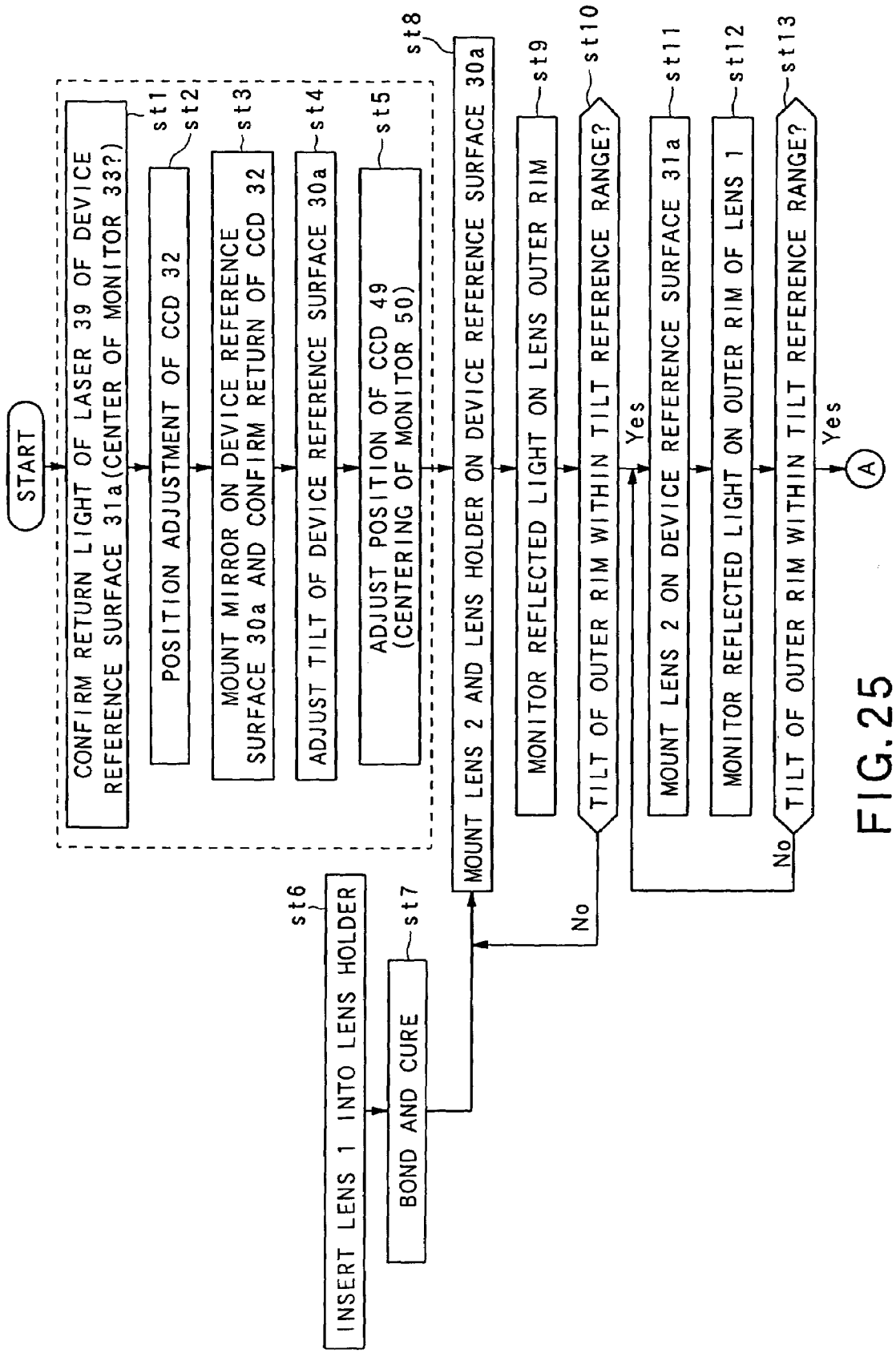
FIG. 25 is a flowchart showing the sequence of operations of an objective lens unit producing method employing the objective lens manufacturing device according to the present invention.
Figure 26:
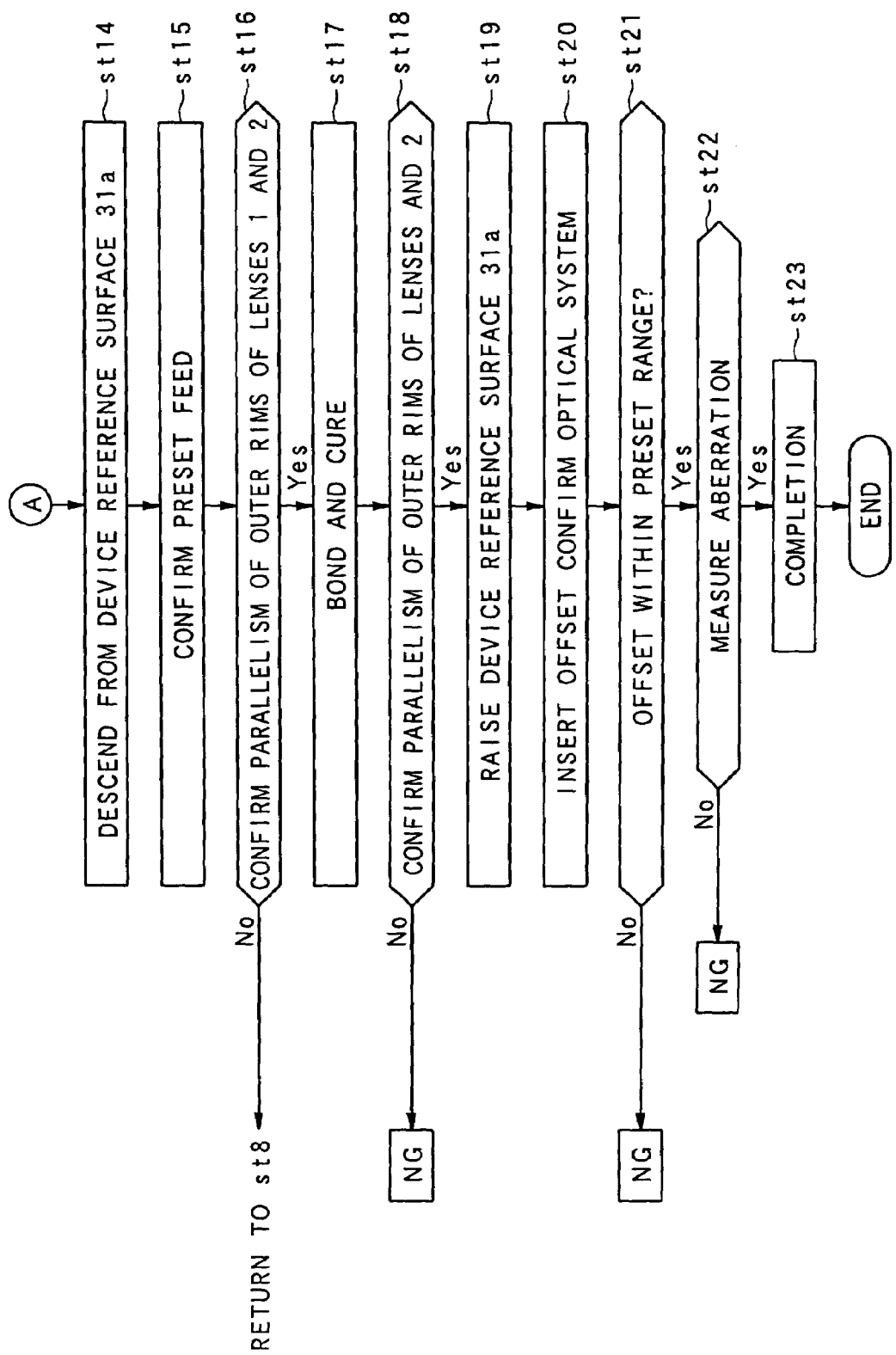
FIG. 26 is a flowchart showing the sequence of operations next following the sequence of operations of FIG. 25.

The sequence of operations for assembling the objective lens unit, described above, is now explained by referring to the flowchart shown in FIGS. 25 and 26. The objective lens unit is assumed to be used for an optical pickup device, with the numerical aperture (NA) of 0.85, a center working wavelength (λ) of 405 nm and an effective diameter of 3 mm. It should be noted that, in the completed objective lens, the major surface of the outer rim 2a of the second lens 2 closer to the optical recording medium and the major surface of the outer rim 1a of the first lens 1 remote from the optical recording medium need to be within a range of tilt of roughly 0.2 mrad to 0.3 mrad. Thus, with the objective lens unit manufacturing device, the surface used for positioning the outer rim 1a of the first lens 1 and the surface used for positioning the outer rim 2a of the second lens 2 need to be adjusted at the outset to a precision higher than that needed for these lenses 1 and 2.

Figure 27:
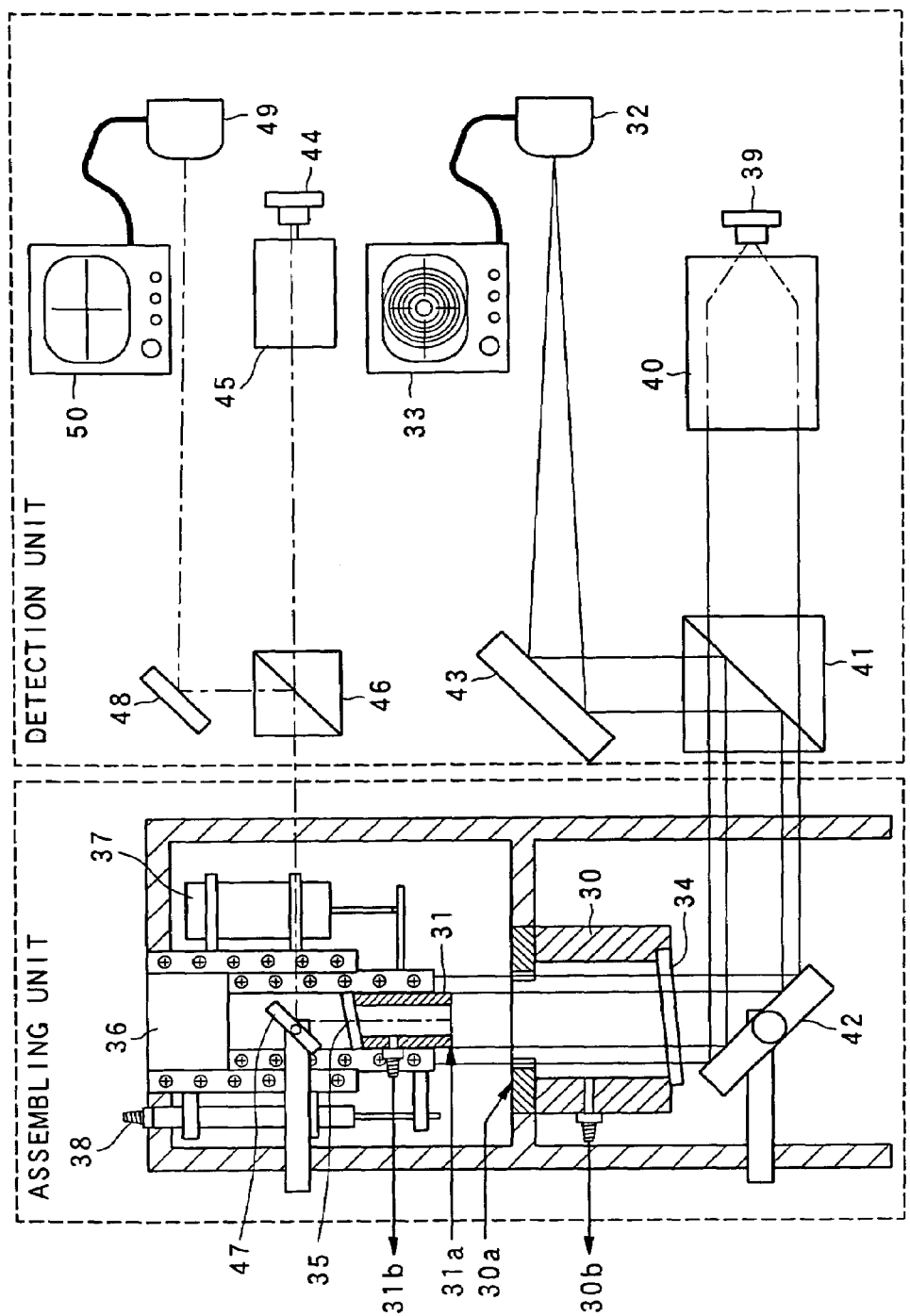
FIG. 27 is a side view showing an objective lens unit driving device performing first adjustment in an objective lens unit manufacturing device according to the present invention, with a portion thereof being broken away.

This adjustment is by the laser light radiated from the first laser light source 39, as shown in FIG. 27. That is, in a step st1 shown in FIG. 25, the lenses 1 and 2 are dismounted from the manufacturing device, and the laser light radiated from the first laser light source 39 and reflected back from the device reference surface 31a of the holding unit 31 is caused to fall on the first CCD 32. In a step st2, the position of the first CCD 32 is adjusted, as the first monitor 33 is viewed, so that the light receiving position is the center position.

In the first monitor 33, since the device reference surface 31a of the holding unit 31 is toroidally-shaped (doughnut-shaped), a concentric diffraction pattern may be observed, as shown in FIG. 27. In adjusting the position of the first CCD 32, adjustment is made so that the center of this concentric pattern is in register with the center of the image format of the first monitor 33.

Figure 28:
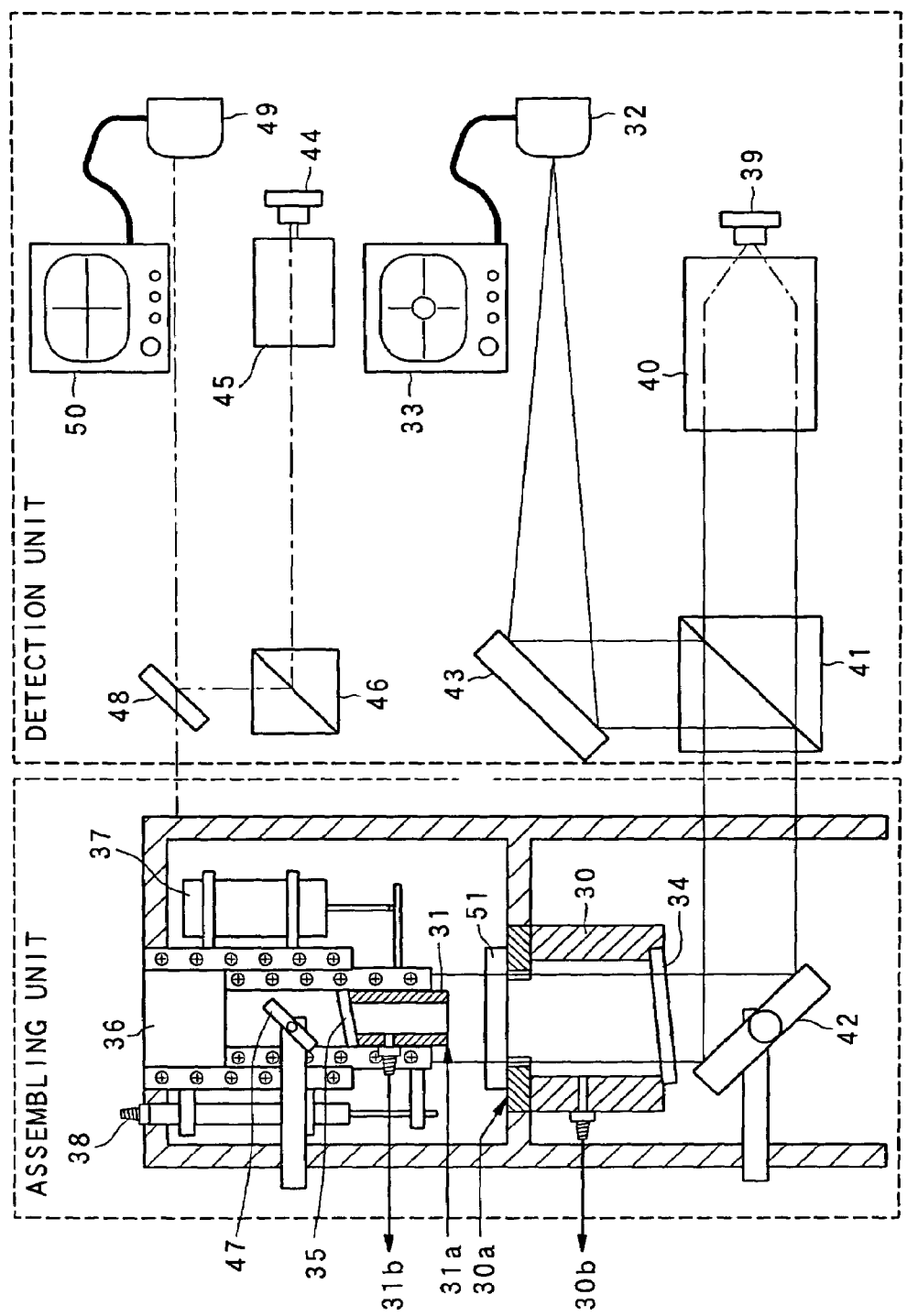
FIG. 28 is a side view showing an objective lens unit driving device performing second adjustment in an objective lens unit manufacturing device according to the present invention, with a portion thereof being broken away.

In the next step st3 of FIG. 25, a planar reflective mirror 51 is placed on the device reference surface 30a of the base unit 30, as shown in FIG. 28. In the next step st4 of FIG. 25, the device reference surface 30a is adjusted for tilt so that, when the reflected light of the light beam from the first laser light source 39 by the reflective mirror 51 is incident on the first CCD 32, the light beam projected on the first monitor 33 will be at the center of the image format.

Up to this step st4, the device reference surface 31a of the holding unit 31 is rendered parallel to the device reference surface 30a of the base unit 30.

Similarly, in a step st5, the position of a second CCD 49 is adjusted using a second laser light source 44 and a second monitor 50.

Figure 29:
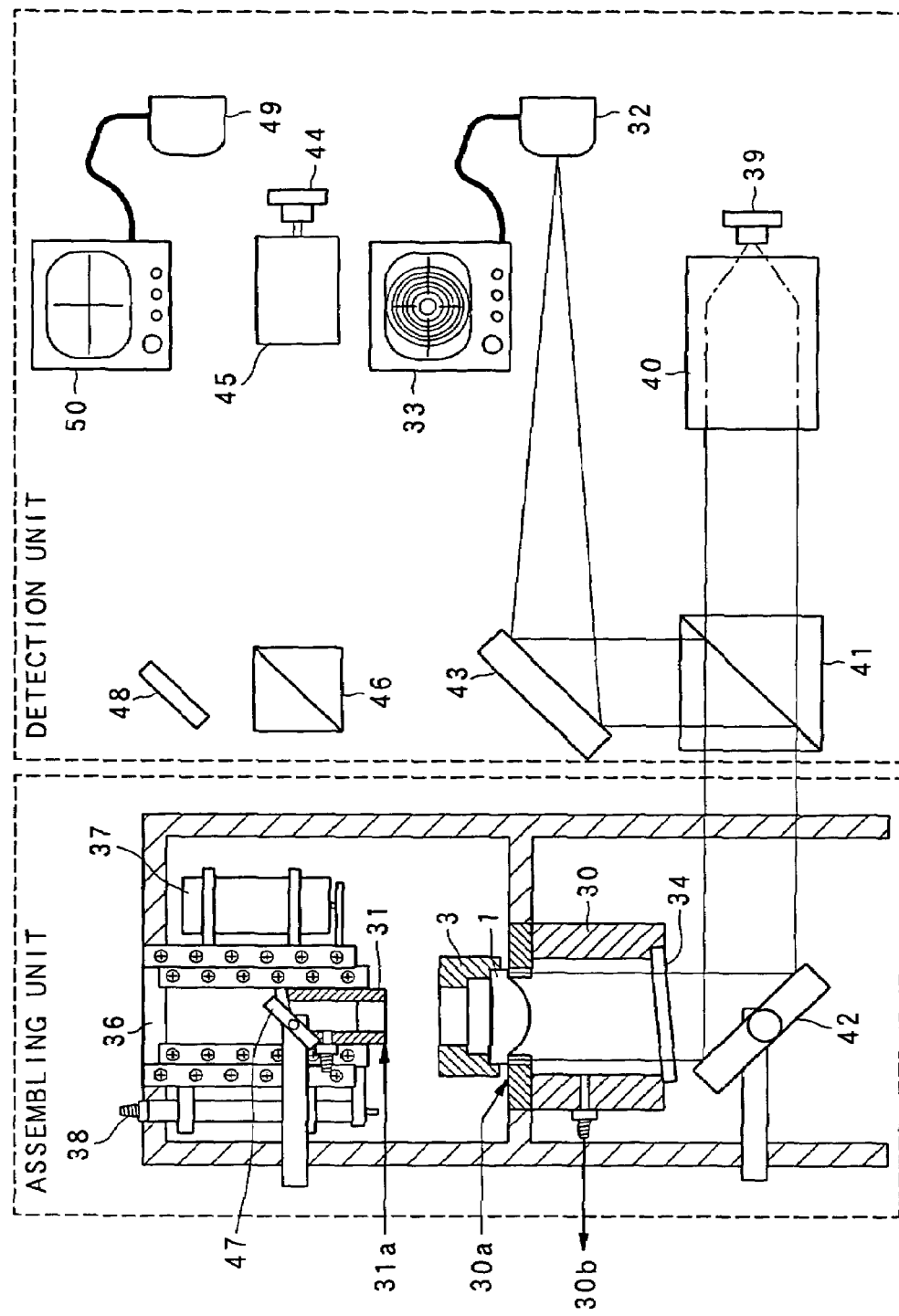
FIG. 29 is a side view showing an objective lens unit driving device performing the mounting of a first lens in an objective lens unit manufacturing method according to the present invention, with a portion thereof being broken away.
Figure 30:
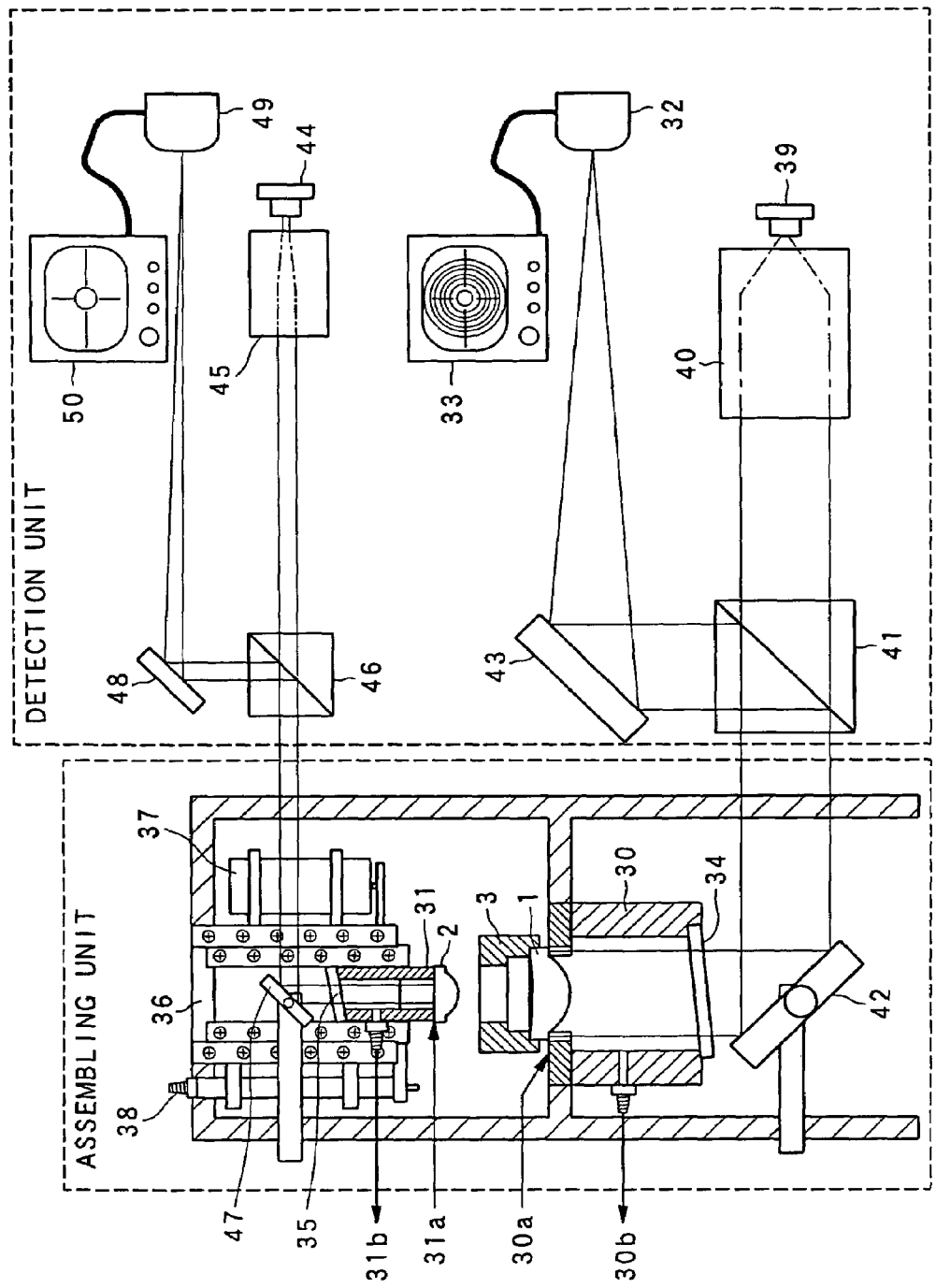
FIG. 30 is a side view showing an objective lens unit driving device performing the mounting of a second lens in an objective lens unit manufacturing method according to the present invention, with a portion thereof being broken away.

Then, processing transfers to a step st8 where the first lens 1, already introduced into and bonded to the lens holder 3 in the steps st6 and st7, is mounted on the device reference surface 30a of the base unit 30, as shown in FIG. 29. At this time, air in the base unit 30 is drawn to outside to lower the inner pressure to attract the first lens 1 to the device reference surface 30a.

It is noted that the reference surface 1b of the outer rim 1a of the first lens 1 needs to be abutted accurately against the device reference surface 30a of the base unit 30. The reason is that, if dust and dirt, for example, are interposed between these reference surfaces 1b and 30a, the lenses 1 and 2 undergo tilting relative to each other, after assembling, thus worsening the optical performance, such as aberration. Thus, even when the first lens 1 is placed on the device reference surface 30a of the base unit 30, it is necessary for the parallelism between the reference surface 1b of the first lens 1 and the device reference surface 30a to be able to be observed.

Referring to FIG. 24B, a cut-out is provided in the device reference surface 30a, as shown in FIG. 24B, so that, as this device reference surface 30a is maintained, the light reflected on the reference surface 1b of the first lens 1 may be returned to the first CCD 32.

Since the reference surface 1b of the first lens 1 is toroidally-shaped, the reflected light on this reference surface 1b may be observed, in a step st9 of FIG. 25, as being a concentric diffraction pattern. If the reference surface 1b of the first lens 1 is completely in tight contact with the device reference surface 30a of the base unit 30, the concentric diffraction pattern, displayed on the first monitor 33, is at the center of the image format, because the reference surfaces 1b and 30a are completely parallel to each other.

If it has been verified in a step st10 from the display surface of the first monitor 33 that, due to dust and dirt becoming trapped between the reference surfaces 1b, 30a, the parallelism between the reference surfaces 1b and 30a is not within the reference value, that is if the concentric diffraction pattern is not at the center of the image format of the first monitor 33, processing reverts to the step st8 to set the first lens 1 again or to sweep the reference surfaces 1b and 30a.

Up to this step, the verticality or parallelism of the outer rim 1a of the first lens 1 and the optical axis or the device reference surface 30a of the base unit 30 may be confirmed. The malfunctioning state of the first lens 1 may be detected before proceeding to the next step.

Then, processing transfers to a step st11 where the second lens 2 is held by the device reference surface 31a of the holding unit 31 by sucking air inside the holding unit 31, as shown in FIG. 26.

Then, processing transfers to a step st12 of FIG. 25 where it is confirmed whether or not the light reflected from the second lens 2 is incident on the center of the second CCD 49, in the same way as above. If, in a step st13, the offset of the center of the reflected light from the image center is not comprised within the reference value, processing reverts to the step still to mount the second lens 2 again or to sweep the device reference surface 31a.

Figure 31:
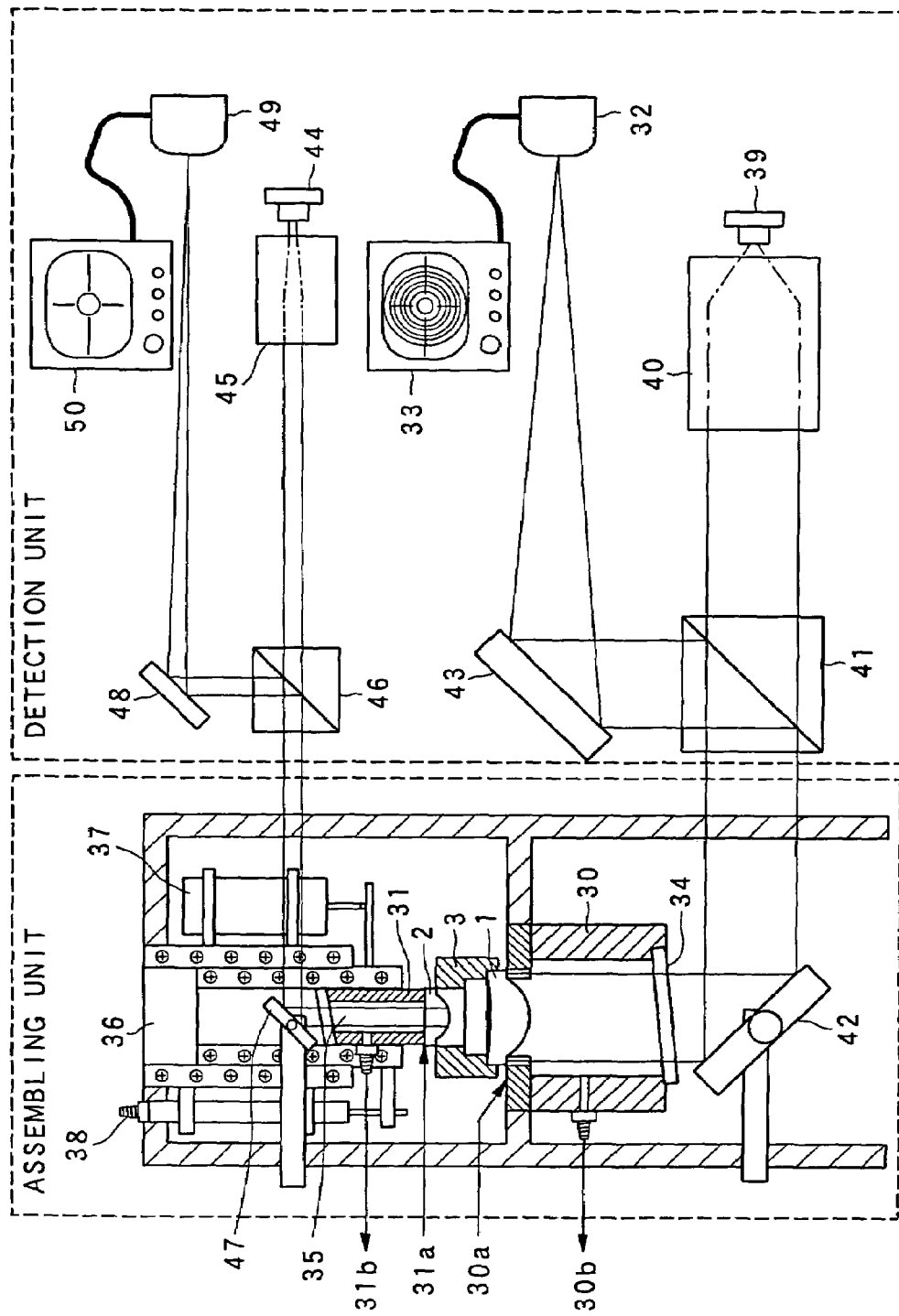
FIG. 31 is a side view of the objective lens unit driving device executing the positioning to the lens holder of the second lens in the objective lens unit manufacturing method according to the present invention, with a portion thereof being broken away.

Up to this step, the parallelism between the second lens 2 and the first lens 1 is comprised within a preset range. In this state, the second lens 2 is caused to descend from above, in a step st14 of FIG. 26, to the lens holder 3, as shown in FIG. 31.

When the first and second lenses 1, 2 are attracted to the device reference surfaces 30a, 31a, the parallelism between these lenses 1 and 2 is kept. However, these lenses 1 and 2 are not positioned with respect to offset.

The lens holder 3 is molded from a thermosetting resin, as described above, and has the function of suppressing the offset between the first and second lenses 1 and 2 to less than several μm. That is, the offset between the first and second lenses 1 and 2 may be removed by moving the second lens 2 along two axes perpendicular to the optical axis, so as to be positioned along the inner radius of the lens holder 3, at the same time as the second lens 2 is introduced into the lens holder 3.

After the offset between the first and second lenses 1, 2 has been removed by the lens holder 3, the holding unit 31 is caused to descend, in a step st15 in FIG. 26, to a preset position at which the second lens 2 is to be positioned ultimately. In order for the device reference surface 31a to be halted at this position, there is provided a stopper, for example. Meanwhile, the length measurement device 37 may be used to monitor whether or not the holding unit 31 has been lowered to the correct position.

In a step st16, the parallelism between the reference surface 1b and 2a of the lenses 1 and 2 is checked. If the parallelism is unsatisfactory, processing reverts to the step st18 and, if it is satisfactory, processing transfers to the next step st17. Thus, in the present manufacturing device, it is possible to check, before positioning and bonding the second lens 2 to the lens holder 3, it is possible to check whether or not the parallelism and the distance between the lenses 1 and 2 are comprised within reference values.

In the next step st17, the second lens 2 is bonded to the lens holder 3, using a UV light curable adhesive, as the second lens 2 has been positioned to the lens holder 3 within a reference range.

With the manufacturing device according to the present invention, it can be checked, in a step st18, by observing the beam position in the second CCD 49, even after curing of the UV light curable resin, whether or not the parallelism between the first and second lenses 1 and 2 is within a reference level. A lens unit is determined to be a reject if the parallelism between the two lenses 1 and 2 is not confined within a reference value.

In a step st19, when the adhesive is cured completely, the attraction of the second lens 2 with respect to the device reference surface 31a of the holding unit 31 is canceled, when the adhesive is cured completely. A lens assy composed of the lenses 1 and 2 and the lens holder 3 is spaced apart from the device reference surface 31a.

Figure 32:
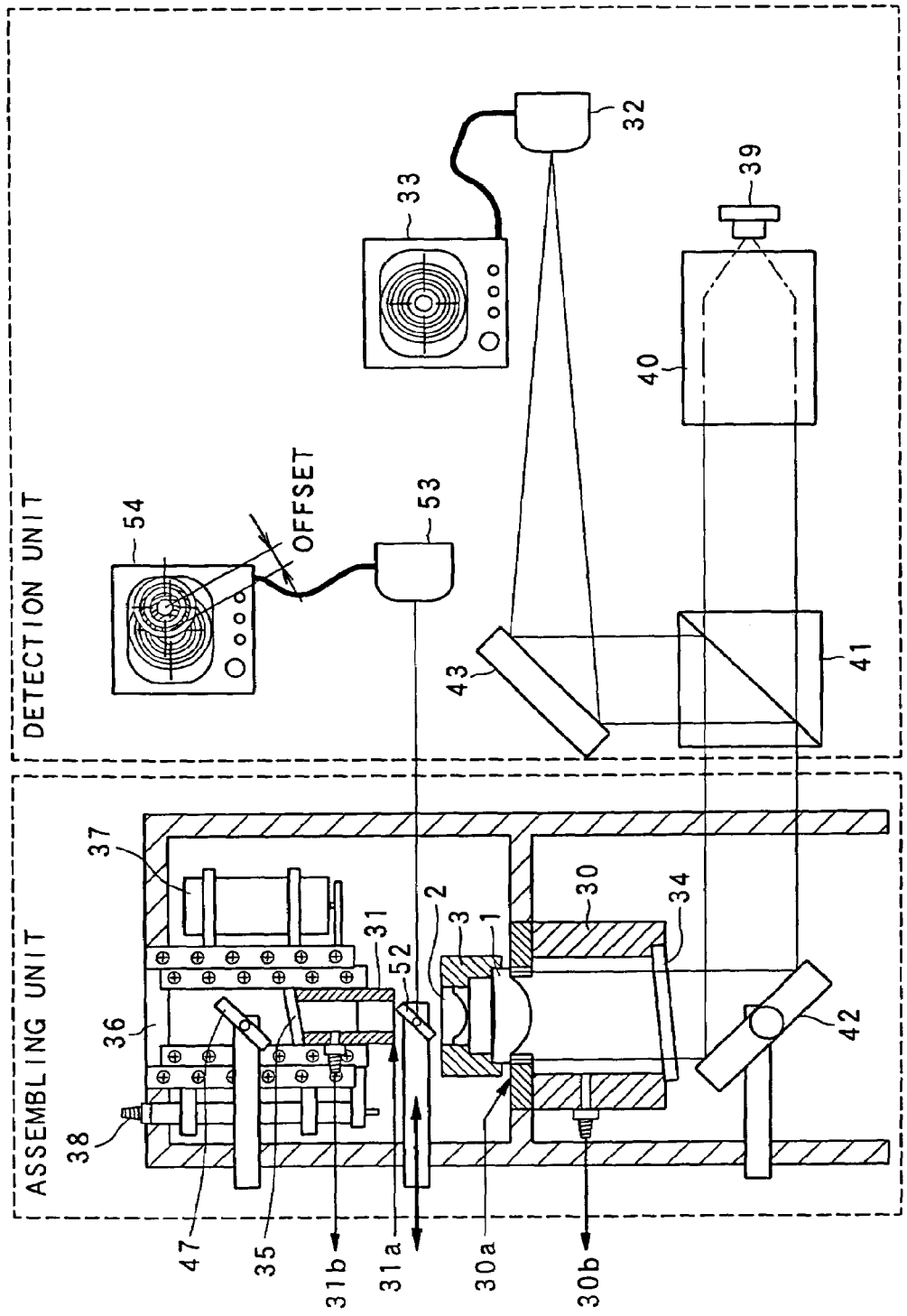
FIG. 32 is a side view of the objective lens unit driving device executing the confirmation of the offset between the lenses in the objective lens unit manufacturing method according to the present invention, with a portion thereof being broken away.

In the next step st20, the holding unit 31 is retreated towards above and an offset confirming mirror 52 is inserted to a space above the lens assy, as shown in FIG. 32. The laser light radiated from the first laser light source 39 is incident on and transmitted through the respective lenses 1 and 2 of the lens assy so as to be received through an offset check mirror 52 by a third CCD 53. The diffraction pattern, imaged by this third CCD 53, is displayed on a third monitor 54.

In a step st21, shown in FIG. 26, it is checked whether or not the offset between the first and second lenses 1 and 2 is comprised within a prescribed range. Turning to the detection of the offset between the two lenses, the offset of the second lens 2 relative to the first lens 1 may be detected by transmitting the laser light through the first and second lenses 1 and 2 and by remote-detecting the center position of the diffraction pattern of the transmitted light, as disclosed in Japanese Laying-Open Patent Publication H-10-255304. A lens unit is determined to be a reject if the parallelism between the two lenses 1 and 2 is not confined within a reference value.

In a step st22, the aberration of the objective lens unit, composed of the first and second lenses 1 and 2, is measured. With the aberration within the reference range, processing transfers to a step st23 to complete the objective lens unit. With the aberration outside the reference range, the objective lens unit is determined to be a reject.

A device for introducing the first lens 1 in the lens holder 3, into which the second lens 2 has already been introduced and bonded in position, is now explained.

The process for manufacturing the objective lens unit, using the manufacturing device, hereinafter explained, is now explained with reference to a flowchart shown in FIGS. 33 and 34.

Figure 35:
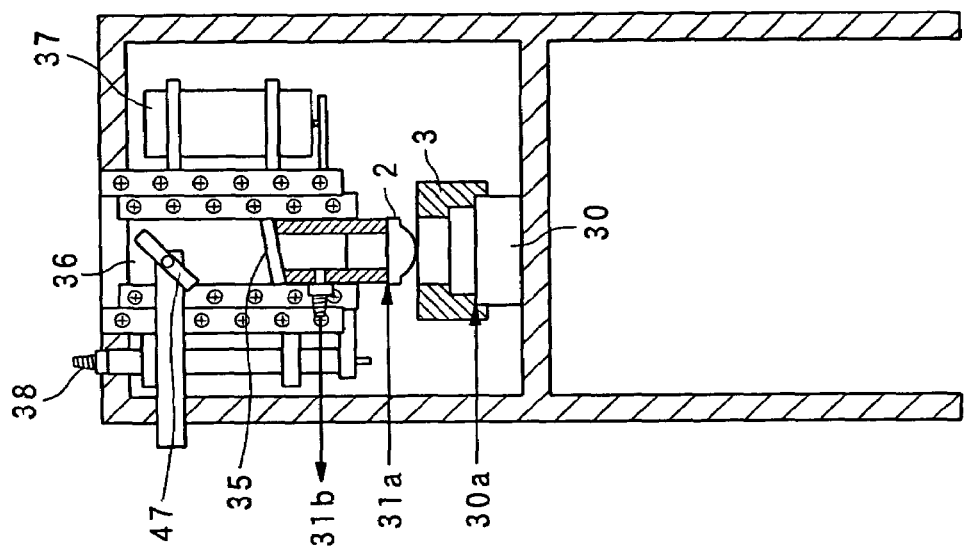
FIG. 35 is a side view showing a first device of another objective lens unit manufacturing device according to the present invention.
Figure 38:
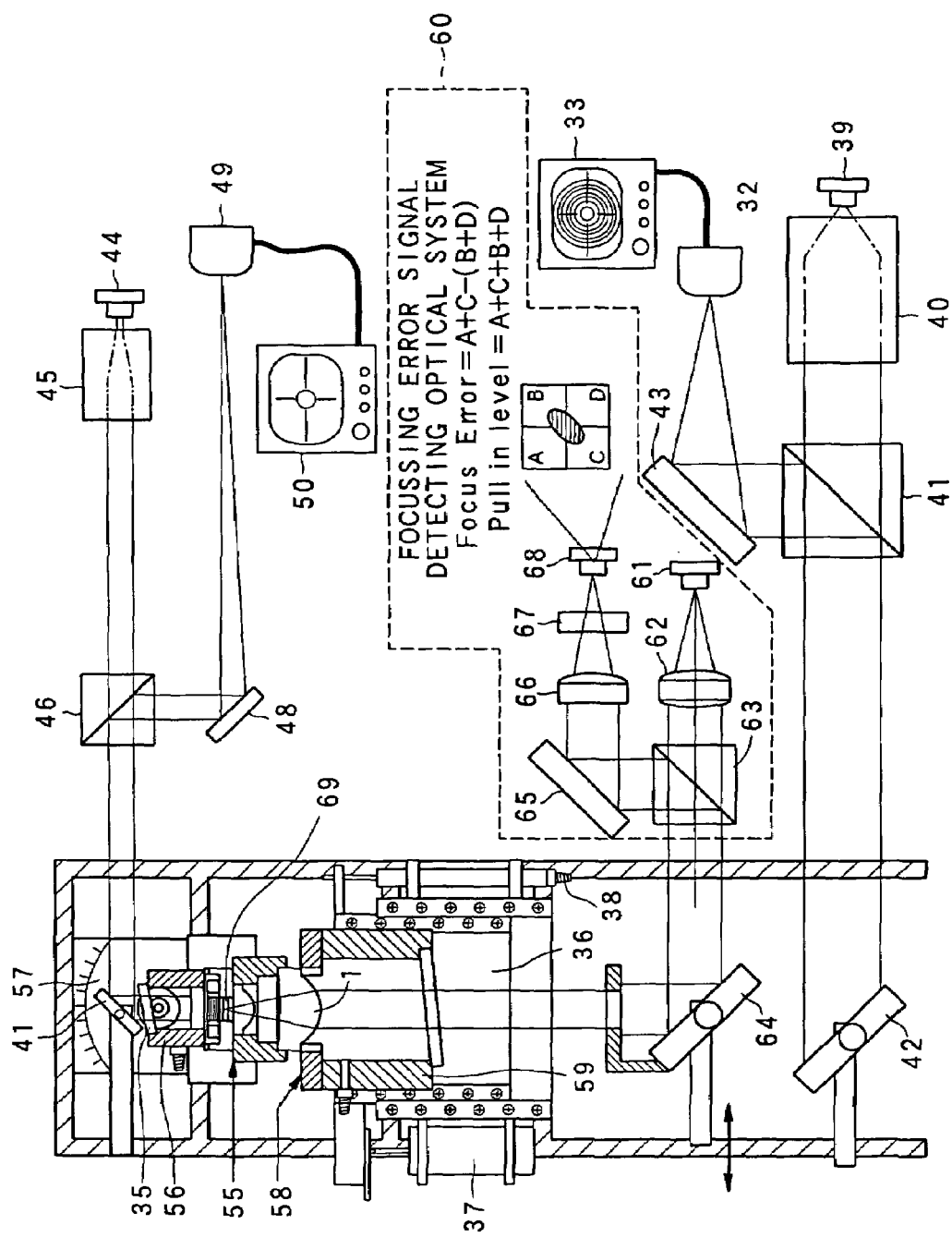
FIG. 38 is a side view showing a second device of the other objective lens unit manufacturing device according to the present invention.

The objective lens unit manufacturing device is made up by a device section for introducing the second lens 2 into the lens holder 3, as shown in FIG. 35, and a device section for introducing the first lens 1 into the lens holder 3, into which the second lens 2 has been introduced, as shown in FIG. 38.

The device section for introducing the second lens 2 into the lens holder 3 includes a holding unit 31 and a base unit 30, as in the case of the above-described manufacturing device, as shown in FIG. 35. This device section introduces the second lens 2 in position in the lens holder 3.

The holding unit 31 is substantially cylindrically-shaped, with an inner spacing, as in the above-described manufacturing device, and houses the second lens 2 under an air pressure differential produced across the inner and outer sides on evacuating the inner spacing by drawing air to outside through a suction through-hole 31b with the outer rim 2a of the second lens 2 abutting on the lower device reference surface 31a. The lower end of the holding unit 31 is kept closed at this time by the second lens 2. The upper end of this holding unit 31 is fitted with a glass cover 35 for hermetically sealing the inner spacing.

The holding unit 31 is supported by a so-called cross roll bearing, that is a uni-axial movement stage 36, and is movable along the optical axis of the second lens 2. The amount of movement of this holding unit 31 may be detected by for example a magnetic length measurement device 37. The holding unit 31 is moved by a driving power source 38, such as a pneumatic cylinder, a linear motor or a stepping motor.

The base unit 30 is substantially columnar-shaped and has its upper surface as a device reference surface 30a. This device reference surface 30a in the previous embodiment is shaped to receive the outer rim 1a of the first lens 1. In the present embodiment, the device reference surface 30a is shaped to set the lens holder 3 directly thereon.

In the present manufacturing device, the absolute distances of the device reference surfaces 30a, 31a along the optical axes are detectable by the length measurement device 37.

Figure 33:
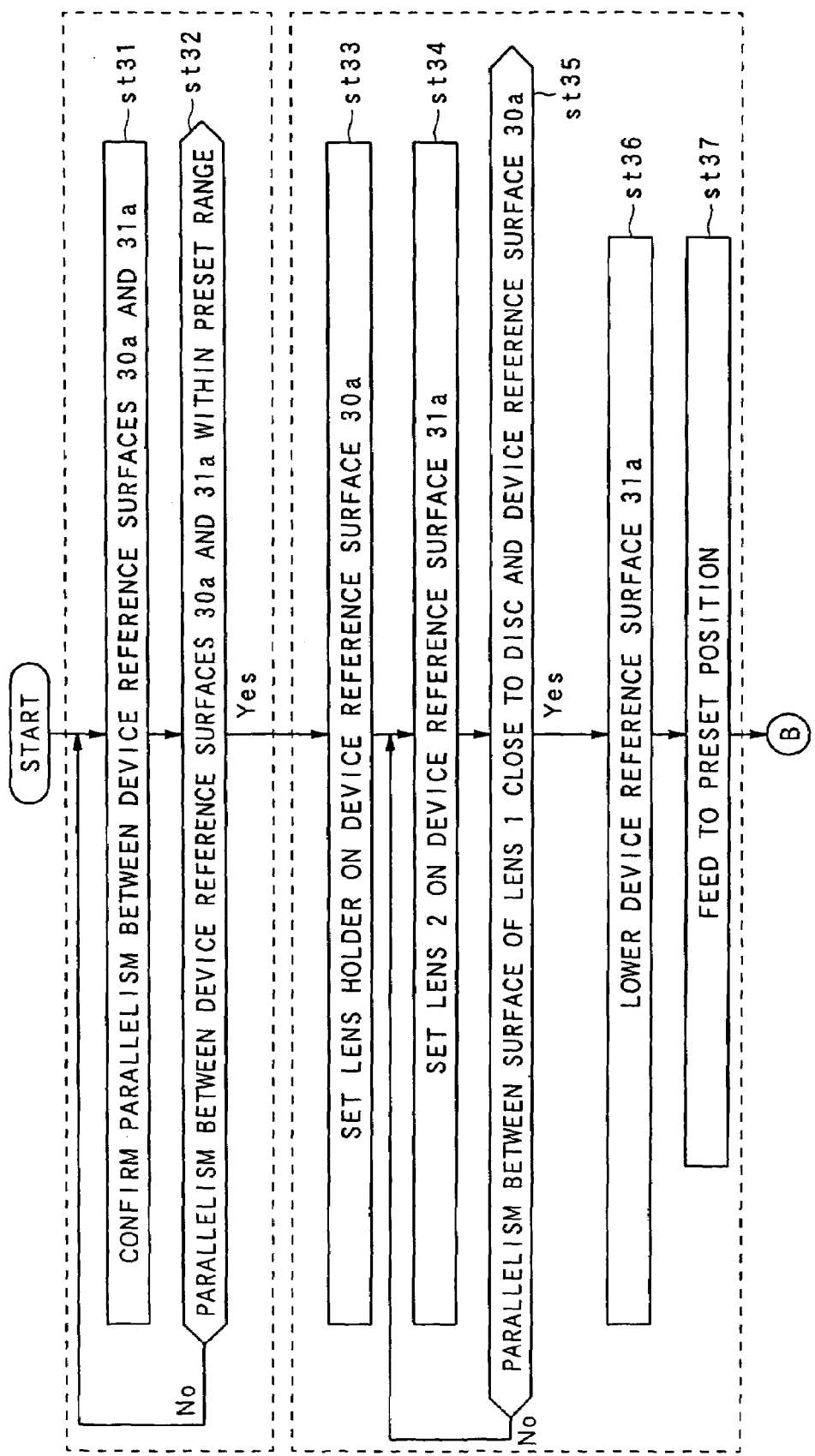
FIG. 33 is a flowchart showing the sequence of operations for manufacturing an objective lens unit using another objective lens unit manufacturing device according to the present invention.

First, in a step st31, shown in FIG. 33, the parallelism between the device reference surface 31a of the holding unit 31 and the device reference surface 30a of the base unit 30 is adjusted accurately at the outset. If, in a step st32, the parallelism between the device reference surfaces 31a, 30a is comprised within a preset value, processing transfers to a step st33 and, if otherwise, processing reverts to the step st31.

In the next step st33, the lens holder 3 is set on the device reference surface 30a of the base unit 30, as shown in FIG. 35. The outer diameter of the device reference surface 30a is set so as to be equal to the outer diameter of the first lens 1, with the step 3a as the reference surface of the lens holder 3 abutting against the device reference surface 30a.

In a step st34, shown in FIG. 33, the reference surface 2b of the second lens 2 is abutted against the device reference surface 31a of the holding unit 31, and air within this holding unit 31 is drawn by suction to attract the second lens 2 to the holding unit 31. In a step st35, shown in FIG. 33, it is monitored whether or not the parallelism between the reference surface 2b of the second lens 2 and the device reference surface 31a of the holding unit 31 is kept, using the laser light. If this parallelism is within a prescribed range, processing transfers to a step st36 and, if otherwise, processing reverts to the step st34 for renewed setting or sweeping the reference surfaces 2b and 31a. The above sequence of operations is repeated until the predetermined parallelism is reached.

Figure 36:
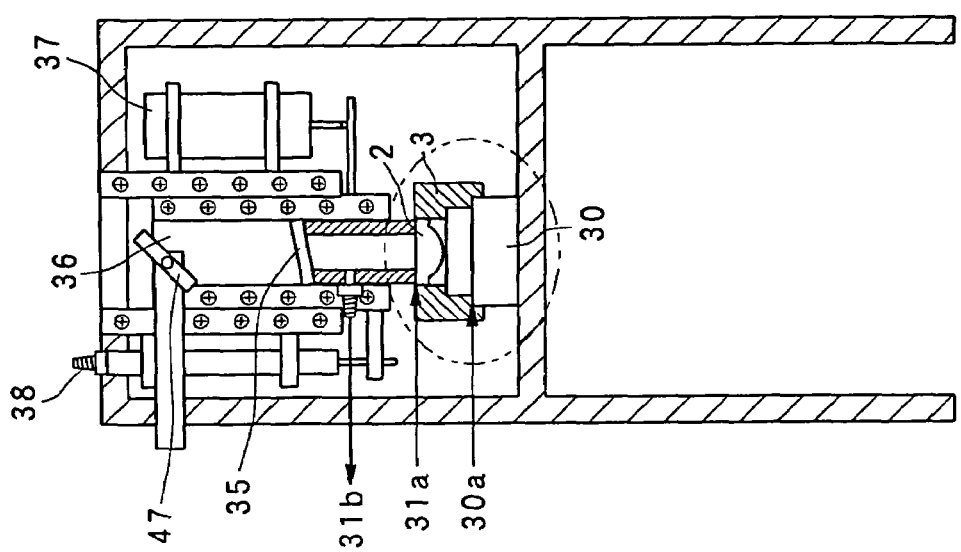
FIG. 36 is a side view showing the state in which the second lens is being positioned to the lens holder in the objective lens unit manufacturing device shown in FIG. 35, with a portion thereof being broken away.

In a step st36, the holding unit 31 is lowered towards the lens holder 3. In a step st37, the holding unit 31 is halted when the device reference surface 31a of the holding unit 31 is at a predetermined distance from the device reference surface 30a of the base unit 30, as shown in FIG. 36. The position relationships between the second lens 2 and the lens holder 3 are selected such that the surface of the second lens 2 towards the optical recording medium and the surface of the protector 6 of the lens holder 3 will be spaced apart by a predetermined distance, as shown in FIG. 37.

Figure 37:
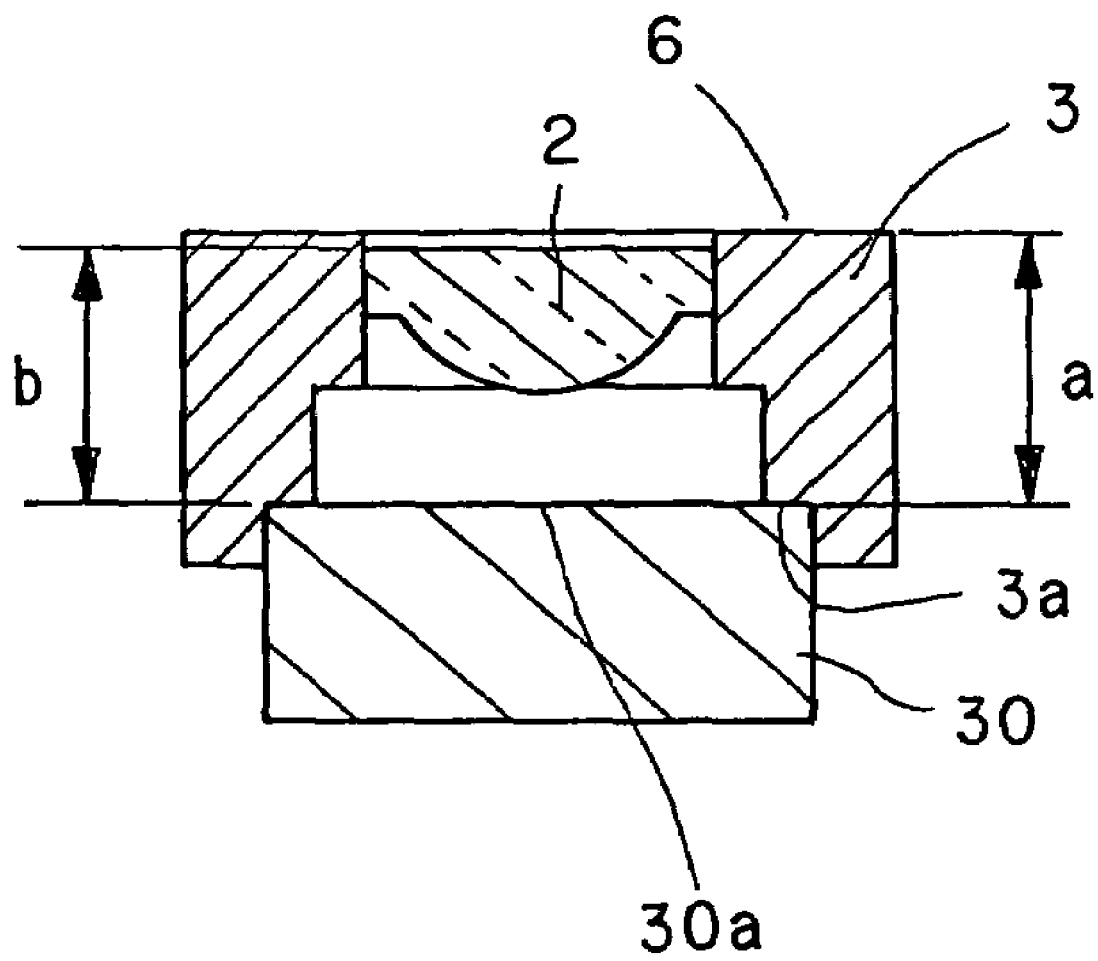
FIG. 37 is a longitudinal cross-sectional view showing the second lens positioned in the objective lens unit manufacturing device shown in FIG. 35 and the lens holder 3.

If the distance from the step 3a of the lens holder 3 to the surface of the protector 6, indicated by arrow a in FIG. 37, is prescribed accurately, the distance between the surface of the second lens 2 towards the optical recording medium and the surface of the protector 6 can be prescribed accurately by prescribing the distance from the device reference surface 30a of the base unit 30 abutted against the step 3a, shown by arrow b in FIG. 37, to the surface of the second lens 2 towards the optical recording medium.

The lens holder 3 is formed e.g., of a thermosetting resin, as described above, and is molded so that the distance from the step 3a to the end face thereof carrying the protector 6 is approximately within ±3 $\mu$m. The protector is formed of a protector material, such as fluorine coating material, having buffering and low friction coefficients, and is formed to a thickness precision within approximately less than tens of $\mu$m. Consequently, the precision on the order of approximately tens of $\mu$m is maintained for the distance from the step 3a to the surface of the protector 6, as shown by arrow α in FIG. 37. The error in the distance from the device reference surface 30a to the surface of the second lens 2, as indicated by arrow b in FIG. 37, is kept to approximately less than several $\mu$m by the objective lens unit manufacturing device. Consequently, the accuracy of approximately less than tens of $\mu$m may be maintained for the distance between the surface of the second lens 2 and the surface of the protector 6.

Figure 34:
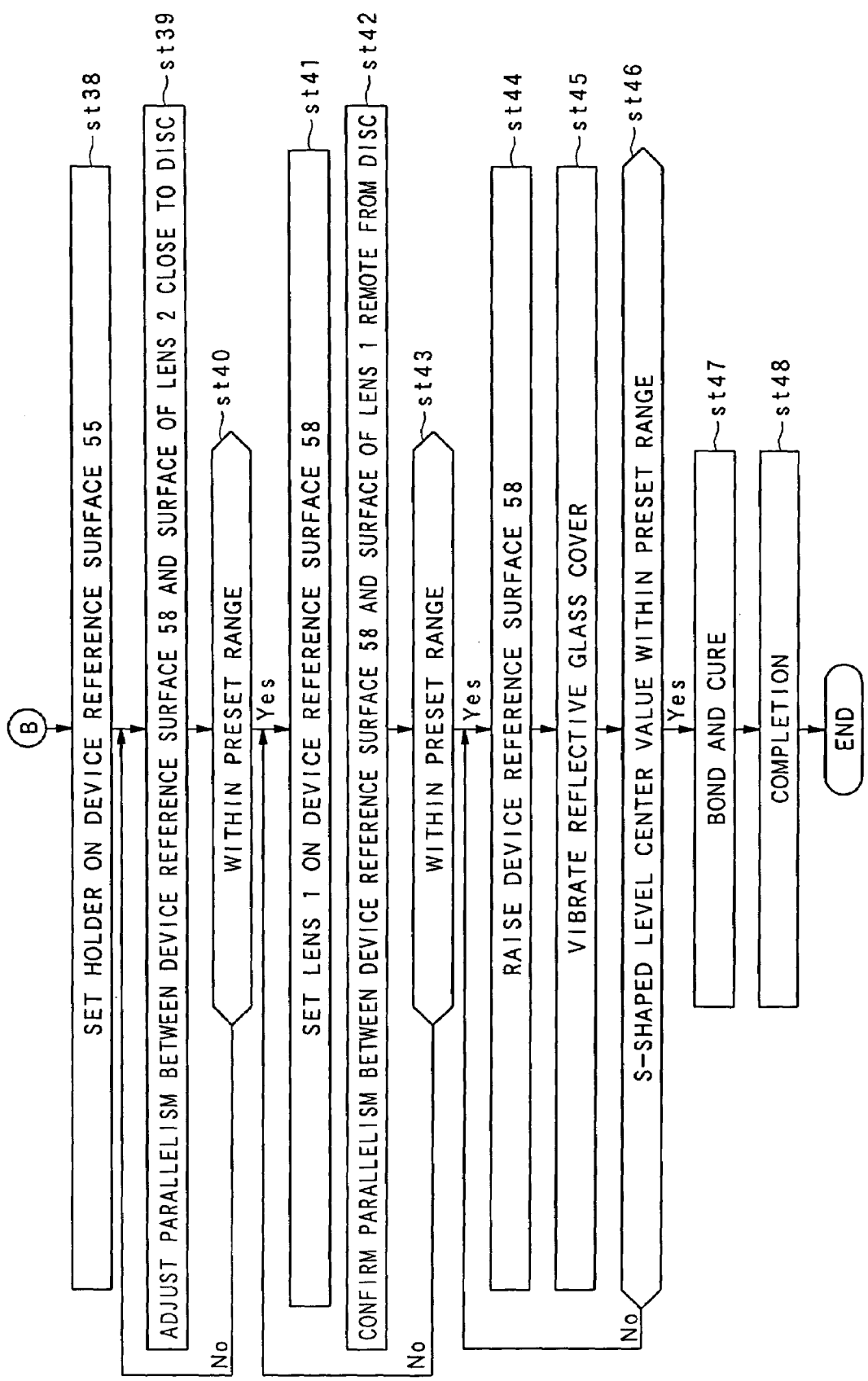
FIG. 34 is a flowchart showing the sequence of operations next following the sequence of operations of FIG. 33.

In the next step st38 of FIG. 34, the lens holder 3, carrying the second lens 2, is mounted on the device section for introducing the first lens 1 into the lens holder 3, as shown in FIG. 38.

This device section includes a movable base unit 59, capable of holding the first lens 1 on a device reference surface 58, by suction, and a holding unit 56, capable of holding the lens holder 3, carrying the second lens 2, by suction on a device reference surface 55. The device reference surface 58, as an upper surface of the movable base unit 59, is adjusted so as to be accurately perpendicular to the optical axis of the first lens 1 placed thereon.

The movable base unit 59 is substantially cylindrically-shaped, with an inner spacing, and holds the first lens 1 under an air pressure differential produced across the inner and outer sides on evacuating the inner spacing, by drawing air therein to outside through a suction through-hole, with the outer rim 1a of the first lens 1 abutting on the device reference surface 58. The upper end of the movable base unit 59 is closed at this time by the first lens 1. The lower end of this movable base unit 59 is fitted with a glass cover 34 for hermetically sealing the inner spacing. The glass cover 34 is tilted relative to the device reference surface 58 towards the upper end thereof to reflect the laser light illuminated on the outer rim 1a of the first lens 1 so as not to produce the stray light.

The movable base unit 59 is supported by a so-called cross roll bearing, that is a uni-axial movement stage 36, and is movable along the optical axes of the first and second lenses 1 and 2. The amount of movement of this movable base unit 59 may be detected by for example a magnetic length measurement device 37. The holding unit 31 is moved by a driving power source 38, such as a pneumatic cylinder, a linear motor or a stepping motor.

The holding unit 56 is substantially cylindrically-shaped, with an inner spacing, and holds the second lens 2 under an air pressure differential produced across the inner and outer sides on evacuating the inner spacing by drawing air therein to outside through a suction through-hole, with the lens holder 3, carrying the second lens 2, abutting on the device reference surface 55. The lens holder 3 mounting the second lens 2 is held by the surface thereof carrying the protector 6 compressing against the device reference surface 55. The lower end of the holding unit 56 is closed at this time by the lens holder 3 and the second lens 2. The upper end of this holding unit 56 is fitted with a glass cover 35 towards its lower end for hermetically sealing the inner spacing. The glass cover 35 is tilted relative to the device reference surface 55 towards its upper end to reflect the laser light illuminated on the outer rim 2a of the second lens 2 so as not to produce the stray light.

The holding unit 56 is supported by an inclined stage 57 for tilt adjustment.

This device includes a detection system, including a first laser light source 39, for detecting the parallelism of the outer rim of the first lens, set on the device reference surface 58 of the movable base unit 59, relative to the device reference surface 58. As the first laser light source 39, any suitable monochromatic light source, such as a gas laser or a solid laser, may be used in addition to a semiconductor laser.

The light beam radiated from the first laser light source 39 is turned into collimated light, with an enlarged beam diameter, by a collimator lens and a beam expander 40. The light beam, now turned into the collimated light, is transmitted through a beam splitter 41, a mirror 42 and the glass cover 34 at the lower end of the movable base unit 59 so as to fall on the upper end of the movable base unit 59. If the first lens is held on the device reference surface 59 at the upper end of the movable base unit 58, this collimated light is reflected by the reference surface 1b of the outer rim 1a of the first lens 1 and thence returned through the glass cover 34 and the mirror 42 to the beam splitter 41.

The return light, reflected back from the is reflected back from the reference surface 1b of the outer rim 1a of the first lens 1, is reflected back from the reflecting surface of the beam splitter 41 and branched from the return optical path to the first laser light source 39 to fall through mirror 43 on the first CCD 32 operating as detection means. The image picked up by the first CCD 32 is displayed on the second monitor 33. The collimating of the light beam from the first laser light source 39 is adjusted on the imaging surface of the first CCD 32 so that the beam diameter will be minimized.

This device includes a detection system, including a second laser light source 44, for detecting the parallelism of the outer rim of the second lens, held under suction on the device reference surface 55 of the holding unit 56, relative to the device reference surface 55. As the first laser light source 39, any suitable monochromatic light source, such as a gas laser or a solid laser, may be used in addition to a semiconductor laser.

The light beam radiated from the second laser light source 44 is turned into collimated light, with an enlarged beam diameter, by a collimator lens and a beam expander 45. The light beam, now turned into the collimated light, is transmitted through a beam splitter 46, a mirror 41 and the glass cover 35 at the upper end of the holding unit 56 so as to fall on the lower end of the holding unit 56. If the second lens 2 is held on the device reference surface 55 at the lower end of the holding unit 56, this collimated light is reflected by the reference surface of the outer rim of the second lens 2 and thence returned through the glass cover 35 and the mirror 41 to the beam splitter 46. The return light is reflected back from the reflecting surface of the beam splitter 46 and branched from the return optical path to the first laser light source 44 to fall through mirror 48 on the second CCD 49 operating as detection means. The image picked up by the second CCD 49 is displayed on the second monitor 50. The collimating of the light beam from the second laser light source 44 is adjusted on the imaging surface of the second CCD 49 so that the beam diameter will be minimized.

This device includes a focusing error signals detecting optical system 60. Similarly to the optical system used in an optical pickup device for an optical disc, this focusing error signal detecting optical system 60 is an optical system for detecting the focusing error signals by a so-called astigmatic aberration method or a differential concentric method. This focusing error signal detecting optical system 60 includes a semiconductor laser 61, as a light source, and collimates the light beam, radiated from the semiconductor laser 61, by a collimator lens 62, and illuminates the resulting collimated light beam through the beam splitter 63, mirror 64 and the glass cover 34 from the lower side of the movable base unit 59 into the inside of the movable base unit 59. If the first lens 1 is set on the device reference surface 58 of the movable base unit 59, the light beam is incident on the first lens 1. If the second lens 2 is mounted on the lens holder 3 by the holding unit 56, the light beam falls on the second lens 2. The collimated light beam, sequentially incident on the first and second lenses 1 and 2, is focussed on a point above the second lens 2. The mirror 64 is reciprocable with respect to the lower portion of the movable base unit 59, and includes an aperture corresponding to the effective diameter of the objective lens unit.

Figure 39:
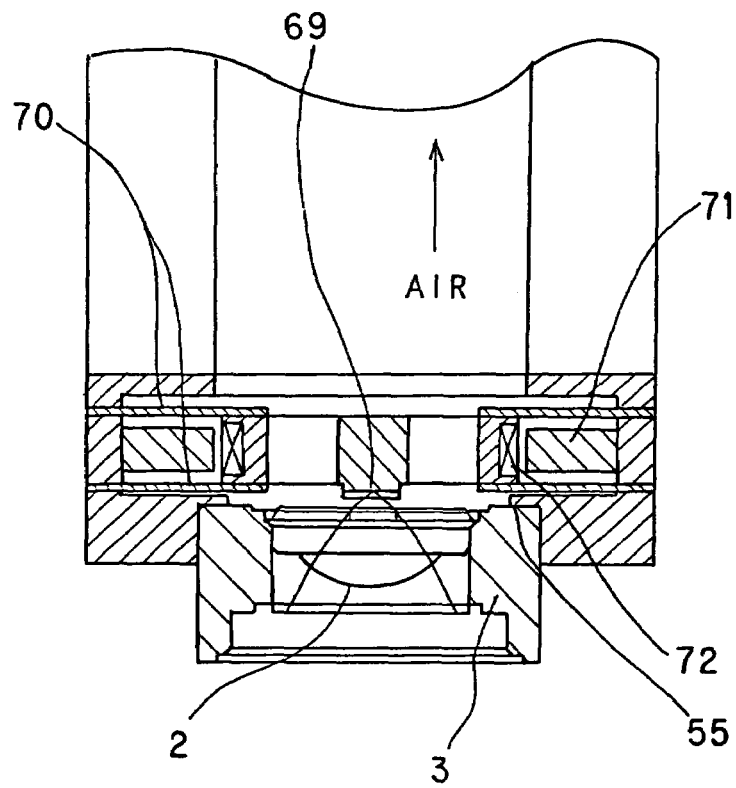
FIG. 39 is a longitudinal cross-sectional view showing essential portions of the second device of the other objective lens unit manufacturing device according to the present invention.

A glass cover 69, having a reflective surface, is mounted in the vicinity of the focal point of the objective lens unit, as shown in FIG. 39. This glass cover 69 is designed to be equal in thickness and refractive index to the cover layer of the optical recording medium used in conjunction with the objective lens unit. The light beam, converged by the first and second lenses 1 and 2, is reflected by the reflective surface of the glass cover 69 and returned to the beam splitter 63 through the second lens 2, first lens 1, glass cover 34 and the mirror 64, as shown in FIG. 38. This return light is reflected by the reflecting surface of the beam splitter 63, on the beam splitter 63, and branched from the return optical path to the semiconductor laser 61. If the astigmatic method is used, this return light is transmitted through the mirror 65, converging lens 66 and a cylindrical lens 67 to produce astigmatic aberration so as to be then converged on the light receiving surface of a photodetector 68.

The light receiving surface of the photodetector 68 is divided from the center into four radial areas, outputting photodetector signals independently of one another. Focusing error signals and pull-in signals may be generated by calculations based on the four photodetector signals, output from the photodetector 68, as will be explained subsequently.

The glass cover 69 is supported by being secured to the movable part of the voice coil motor as driving means actuatable in the optical axis direction as shown in FIG. 39. This voice coil motor has a leaf spring 70. The glass cover 69 and the coil 72 are carried by this leaf spring 70 so that the glass cover 69 and the coil 72 are movable as movable parts. The voice coil moto is a fixed part and includes a magnet 71 in the vicinity of the coil 72.

In the voice coil motor, the glass cover 69 is moved along the direction of the optical axis, under the interaction of the current supplied to the coil 72 and the magnetic field generated by the magnet 71, by the driving current supplied to the coil 72.

Figure 40:
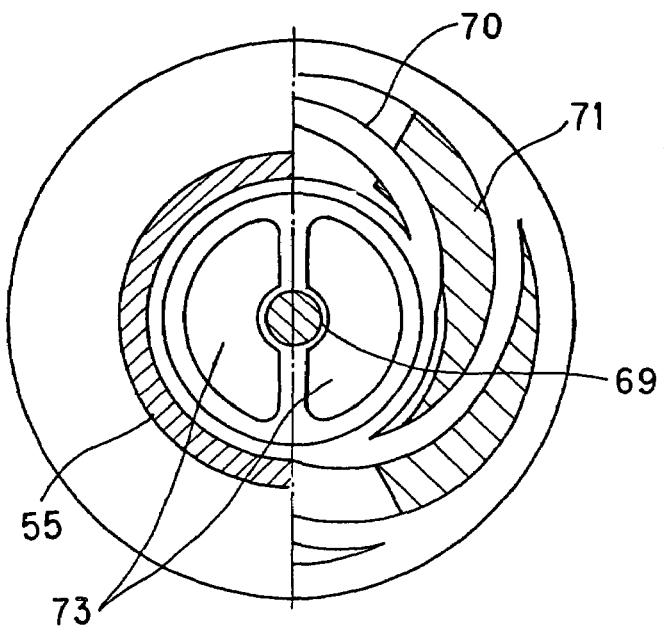
FIG. 40 is a plan view showing essential portions of the second device of the other objective lens unit manufacturing device according to the present invention, with a portion thereof being broken away.

The leaf spring 70 of the voice coil motor includes a through-hole 73 for transmission smaller in diameter than the second lens 2, in order for the laser light radiated from the second laser light source 44 to be illuminated on the surface of the second lens 2 proximate to the optical recording medium, as shown for example in FIGS. 39 and 40. With the detection system, having the second laser light source 44, the parallelism of the surface of the second lens 2 close to the optical recording medium to the device reference surface 58 of the movable base unit 59 can be monitored through this through-hole 73.

In a step st39, shown in FIG. 34, the parallelism between the device reference surface 58 of the movable base unit 59, used for positioning the first lens 1, and the surface of the second lens 2, mounted to the lens holder 3, held by the holding unit 56, which surface is closer to the optical recording medium, is adjusted. If the parallelism between the surface of the second lens 2 and the device reference surface 58 of the movable base unit 59 is not comprised within the preset range, the inclined stage 57 is adjusted so that the parallelism between the surface of the second lens 2 and the device reference surface 58 of the movable base unit 59 will be comprised within the preset range. In a step st40, the parallelism between the device reference surface 58 and the surface of the second lens 2 is checked and, if the parallelism is within the prescribed range, processing transfers to a step st41. If otherwise, processing reverts to a step st39.

In a step st41, the first lens 1 is mounted on the device reference surface 58 of the movable base unit 59, as shown in FIG. 38. In a step st42, shown in FIG. 34, the laser light from the first laser light source 39, reflected by the reference surface 1b of the first lens 1, is checked to verify the parallelism between the reference surface 1b of the first lens 1 and the device reference surface 58 of the movable base unit 59. At this time, the mirror 64 of the focusing error signal detecting optical system 60 is receded back from the position below the movable base unit 59.

If, in a step st43, the parallelism is within the prescribed range, processing transfers to a step st44. If the parallelism is not within the prescribed range, processing reverts to a step st41 for re-setting, or the reference surfaces 1b and 58 are swept. This sequence of operations is repeated until the parallelism is within the prescribed value.

When the parallelism of the reference surface 1b of the first lens 1 with respect to the device reference surface 58 is confirmed, the mirror 64 of the focusing error signal detecting optical system 60 is inserted to a position below the movable base unit 59, as shown in FIG. 38.

If the refractive curved surfaces and thicknesses of the respective lenses of the double lens set are all equal to the design values, the spherical aberration should be zero when the distance between the two lenses of the set is equal to the design value. In actuality, however, refractive curved surfaces or the thicknesses of the respective lenses, possibly affecting the spherical aberration, are deviated from the design values, due to, for example, an offset from a design value of the metal die for molding, or variations in the molding conditions. It is known to adjust the distance between the two lenses to minimize the spherical aberration in the assembled state of the double lens set. In this objective lens set manufacturing device, adjustment may be made by exploiting this principle, in such a manner that, as the focusing error signals are detected, the device reference surface 58 is raised to a position where the center value of the focusing error signals is zero, in order to minimize the spherical aberration on the objective lens unit under a condition that the lenses molded using variable metal dies or under variable molding conditions co-exist.

That is, in a step st44 shown in FIG. 34, the movable base unit 59 is uplifted to introduce the first lens 1 set on the device reference surface 58 into the lens holder 3. In a step st45, the glass cover 69 is vibrated along the optical axis by the voice coil motor. That is, when the movable base unit 59 is raised, a sinusoidal driving voltage, for example, is supplied to the coil 72 of the voice coil motor to vibrate the glass cover 69 along the optical axis.

In the optical pickup device of the recording and/or reproducing apparatus, employing an optical recording medium, the objective lens unit is vibrated along the optical axis by an objective lens unit driving actuator to detect the so-called focusing error signals (S-shaped signal) and a sum signal to be incident on a detector (pull-in signal) to set the application timing of focusing servo. In the present manufacturing device, the objective lens unit is fixed, instead of vibrating the objective lens unit by the objective lens unit driving actuator, with the glass cover 69 being forced into vibrations. At this time, the focusing error signals and the pull-in signals are detected, as shown in FIGS. 41A to 41C.

Referring to FIG. 38, with photodetector signals A to D from the respective areas of the light receiving surface of the photodetector 68, the signal levels of the focusing error signals in the case of, for example, an astigmatic method, are defined by [A+C− (B+D)], while the pull-in level is defined by [A+C+B+D)].

Figure 41:
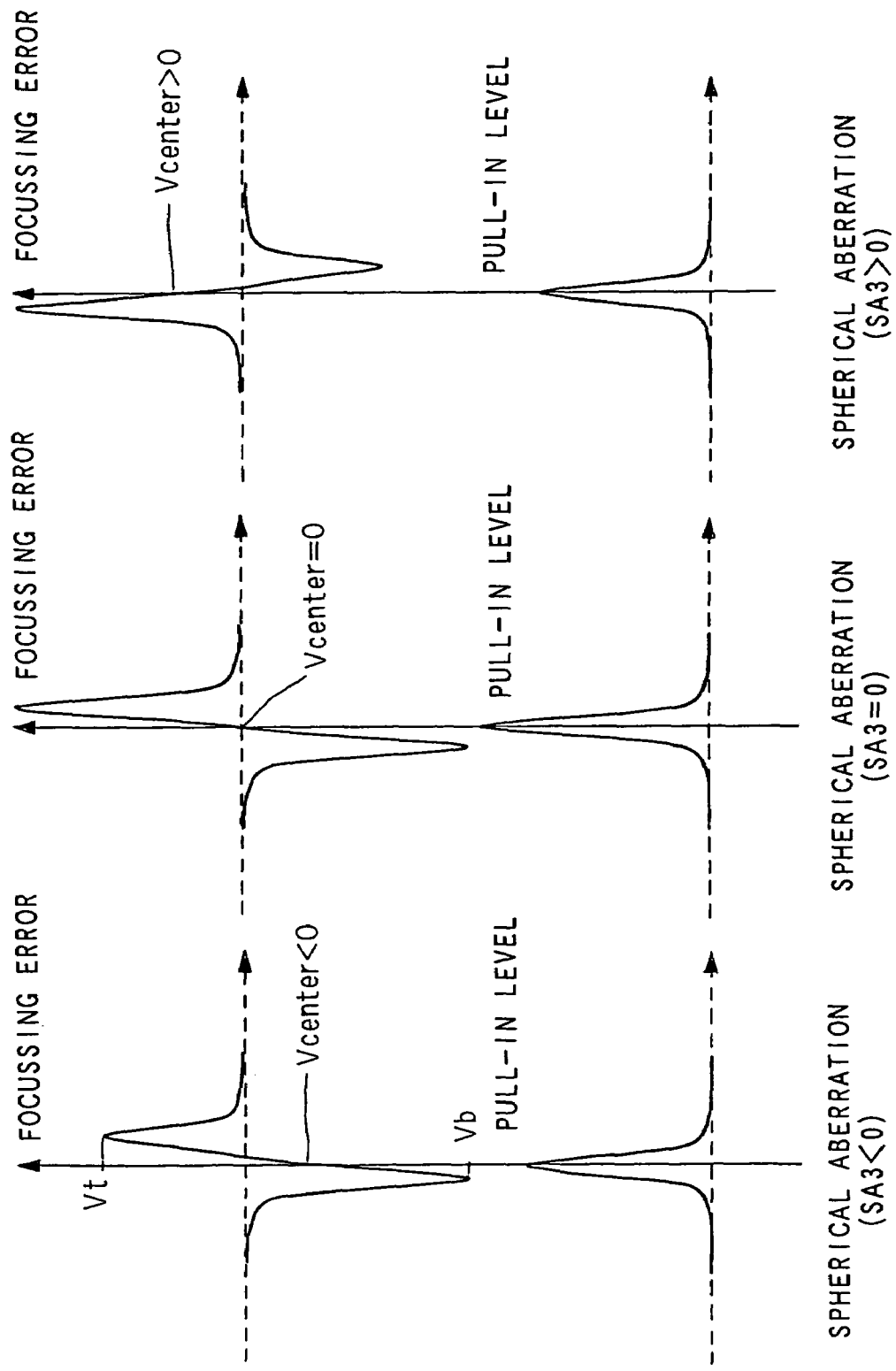
FIGS. 41A to 41C are graphs showing the relationship between the spherical aberration in the objective lens unit and focusing error signals.

Referring to FIGS. 41A to 41C, the relationship between the S-shaped waveform of the focusing error signals and the spherical aberration of the objective lens unit is hereinafter explained. With the zero spherical aberration, the S-shaped waveform of the focusing error signals becomes symmetrical in the up-and-down, with the focusing error signals becoming zero V for the maximum pull-in level. If the spherical aberration is of a negative polarity, the S-shaped waveform of the focusing error signals becomes asymmetrical in the up-and-down direction, with the focusing error signals being of negative polarity at the maximum pull-in level, as shown in FIG. 41A. If conversely the spherical aberration of the objective lens unit is of a positive polarity, the S-shaped waveform of the focusing error signals becomes asymmetrical in the up-and-down, with the focusing error signals becoming of a positive polarity for the maximum pull-in level, as shown in FIG. 41C.

The state of the focusing error signal level can be estimated from the signal level of the focusing errors at the maximum point of the pull-in level. Alternatively, the state of the focusing error signal level can be estimated by detecting the level of the center value of the S-shaped signal of the focusing error signals.

The level of the center value of the S-shaped waveform of the focusing error signals (V center) may be defined by:

$V \text{ center}=(Vt+Vb)/2$ where Vt and Vb are a top voltage and a bottom voltage of the S-shaped signal of the focusing error signals, respectively.

Figure 42:
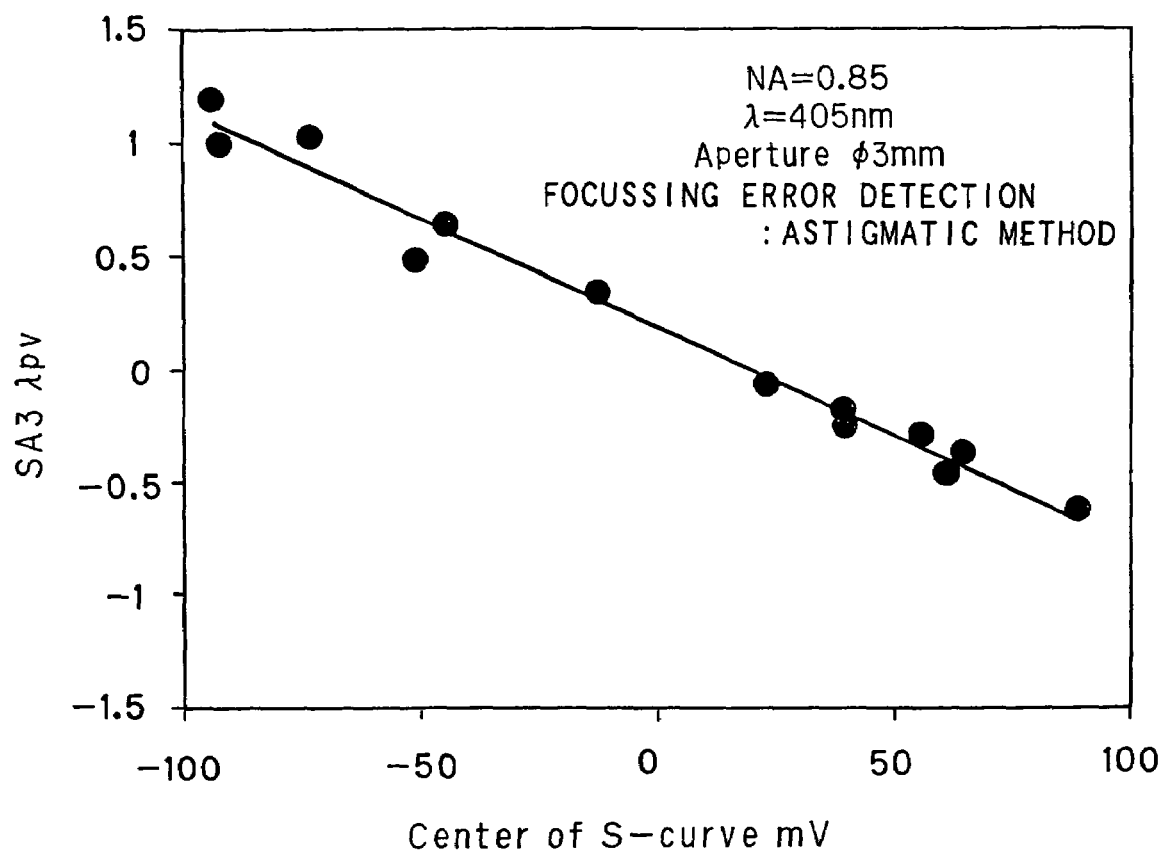
FIG. 42 is a graph showing the relationship between the spherical aberration in the objective lens unit and the central value of the focusing error signals.

If the spherical aberration of the objective lens unit is plotted against the center value (voltage) of the S-shaped signal waveform of the focusing error signals, a constant relationship is obtained, as shown in FIG. 42. Meanwhile, the graph shows data in which plural lenses molded using plural metal dies co-exist, with the numerical aperture (NA) of 0.85, the working wavelength (λ) of 405 nm and with the effective diameter of 3 mm. Based on this relationship, it is possible to find a center value of the S-shaped signal for which the absolute value of the spherical aberration is minimum.

In a step st46, shown in FIG. 34, the center value of the S-shaped signal of the focusing error signals is detected to check whether or not the so detected value is within a preset range with respect to a preset value. It the center value is within a prescribed value, processing transfers to a step st47 and, if otherwise, processing reverts to a step st44 to repeat the processing of adjusting the position of the first lens 1.

In a step st47, the first lens 1 is bonded to the lens holder 3. The objective lens unit is completed on curing the adhesive in a step st48.

Figure 43:
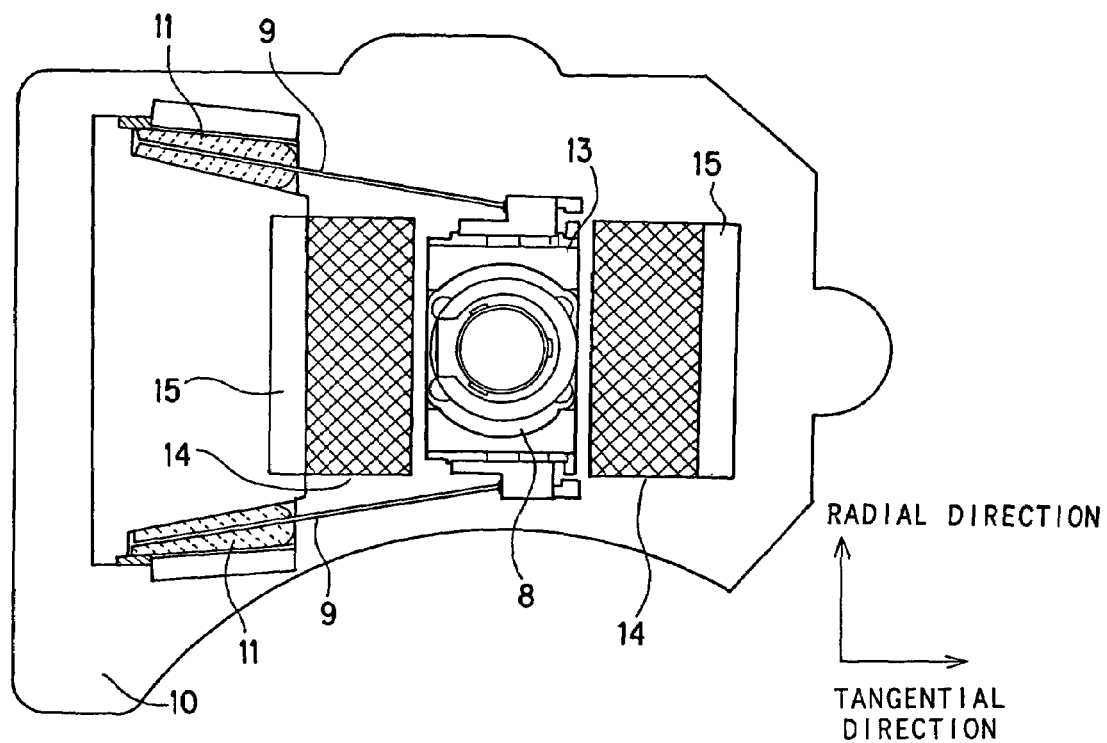
FIG. 43 is a plan view showing the structure of an objective lens driving device employing an objective lens unit manufactured using the method or the device according to the present invention.
Figure 44:
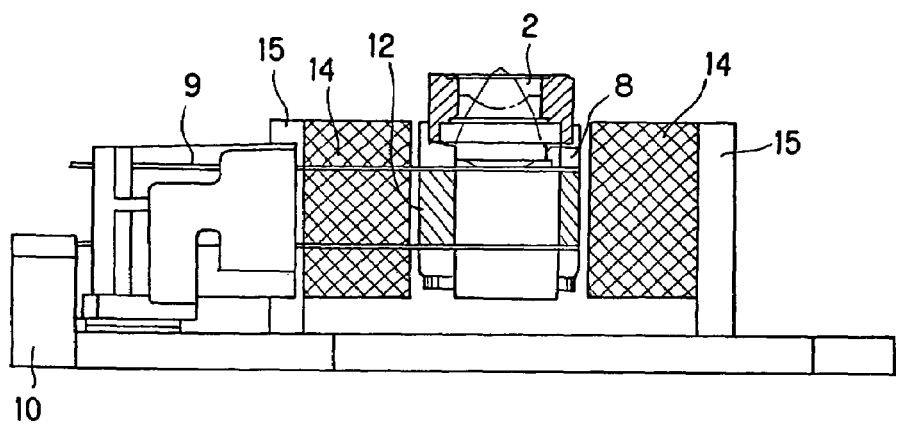
FIG. 44 is a side view showing the structure of an objective lens driving device employing the objective lens unit shown in FIG. 43.

Similarly to the conventional single-lens glass molded objective lens or an objective lens formed of synthetic resin, the objective lens unit, assembled using the device and the method according to the present invention, is used for an optical pickup device. Similarly to the conventional objective lens, the objective lens unit may be mounted to the objective lens driving mechanism used for a conventional optical pickup device as shown in FIGS. 43 and 44.

As the objective lens unit driving mechanism, on which is loaded the objective lens unit of the present invention, such a mechanism similar to the conventional mechanism may be used. For example, in a four-wire type objective lens driving mechanism, in which the objective lens unit is carried in a cantilevered fashion with four wires, as shown in FIGS. 43 and 44, a coil bobbin 8, carrying the objective lens, is movably supported by a base block 10 using four resilient wires 9. A dumper material 11 is provided on the proximal sides of the wires 9 carried by the base block 10. A focusing coil 12 and a tracking coil 13 are mounted on the coil bobbin 8. On the base block 10 are mounted a magnet 14 and a yoke 15. The magnet 14 and the yoke 15 are arranged so that the focusing col 12 and the tracking coil 13 are placed in the magnetic field thereby produced.

When the driving current is supplied to the focusing coil 12, the objective lens unit driving mechanism causes movement of a coil bobbin 8 along the focusing direction parallel to the optical axis of the objective lens unit, under the interaction of the driving current and the magnetic field formed by the magnet 14 and the yoke 15. Moreover, when the driving current is supplied to the tracking coil 13, the objective lens unit driving mechanism causes movement of the coil bobbin 8 along the planar tracking direction perpendicular to the optical axis of the objective lens unit.

The optical pickup device controls the driving currents supplied to the focusing col 12 and the tracking coil 13 to cause movement of the objective lens unit to control the position of the objective lens unit in such a manner that the light spot of the light beam converged by this objective lens unit will be formed at all times on the signal recording surface of the optical recording medium to follow the recording track formed on the optical recording medium.

If the optical recording medium is an optical disc, the up-and-down direction in FIG. 43 and the depth-wise direction in FIG. 44 correspond to the radial direction of the optical disc, while the left and right direction in FIGS. 43 and 44 correspond to the tangential direction thereof.

Figure 45:
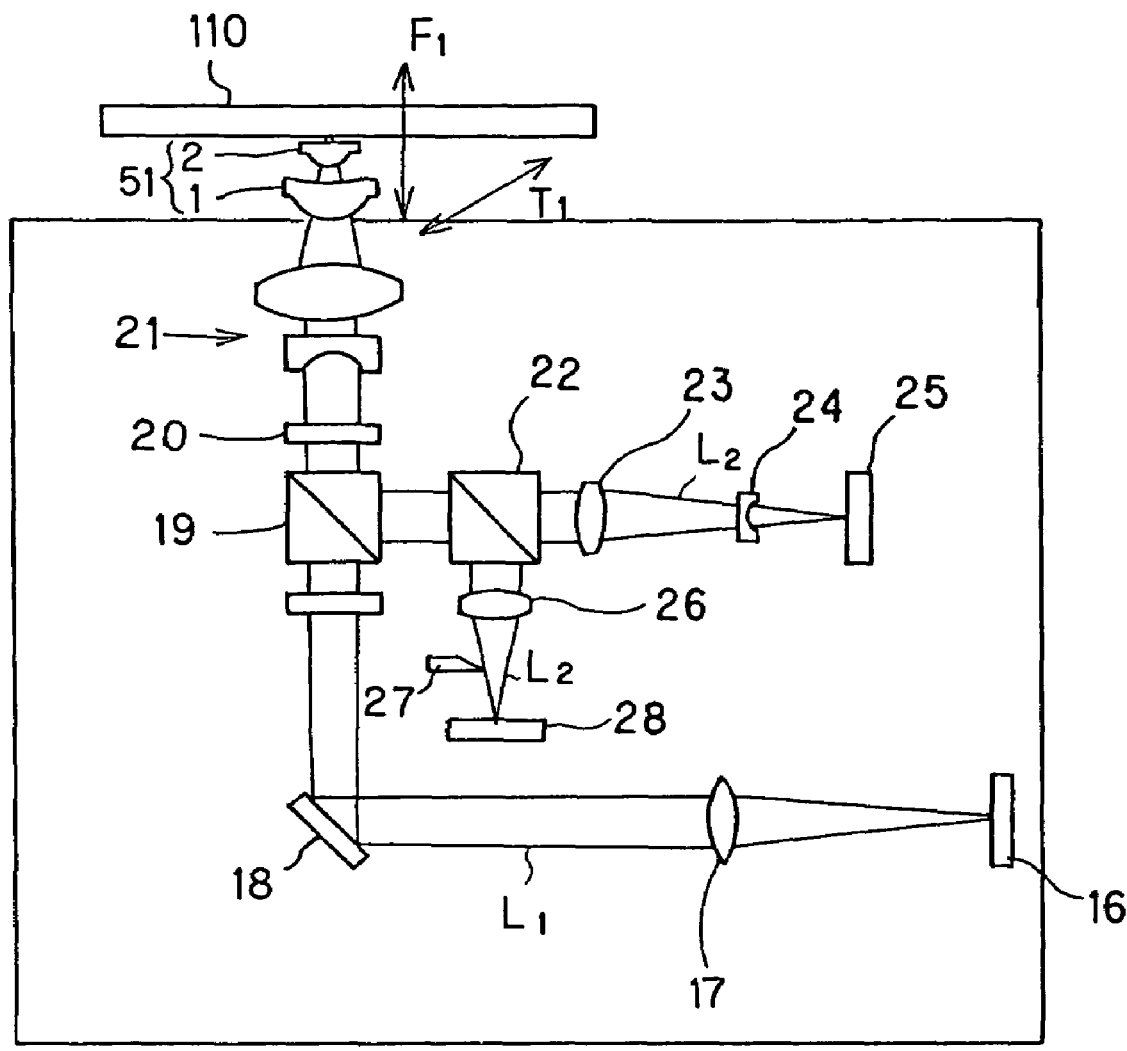
FIG. 45 is a side view showing the optical pickup device and a recording and/or reproducing apparatus having an objective lens unit driving device employing an objective lens unit manufactured using the method or the device according to the present invention.

The optical pickup device, having the objective lens unit driving mechanism and the objective lens unit according to the present invention, includes a semiconductor laser (LD) 16, operating as a light source, as shown in FIG. 45. A linear-polarized light beam L1, radiated as a divergent light beam from the semiconductor laser 16, is collimated by a collimator lens 17 and has its optical path bent by 90° by the mirror 18 to fall on a polarizing beam splitter (PBS) 19. The light beam transmitted through the polarizing beam splitter 19 is turned into circular polarized light by a λ/4 plate (quarter wave plate) 20 to fall on a beam expander 21 composed of a concave mirror and a convex lens so as to be thereby expanded in beam diameter to fall on an objective lens unit 51. This objective lens unit 51 is supported by an objective lens unit driving mechanism, not shown, for movement in the focusing direction $F_1$ parallel to the optical axis and in a planar tracking direction $T_1$ perpendicular to the optical axis.

The light beam incident on the objective lens unit is converged by this objective lens unit 51 and illuminated on the signal recording surface of an optical recording medium 110, such as an optical disc. The light beam $L_1$, illuminated on the signal recording surface of the optical recording medium 110, is modulated in a preset manner by this signal recording surface with respect to the direction of polarization and reflected to fall on the objective lens unit 51. A return light beam $L_2$ is transmitted through a beam expander 21 and turned by the λ/4 plate (quarter wave plate) 20 into linear polarized light of the direction of polarization perpendicular to the direction of polarization of the light beam $L_1$ incident on the optical recording medium 110. The resulting linear polarized light is returned to the polarizing beam splitter 19.

The return light beam $L_2$ is reflected by the reflecting surface within the beam splitter 19 to fall on a second polarizing beam splitter 22. This second polarizing beam splitter 22 is set so that, in the state in which the return light beam $L_2$ is not modulated by the optical recording medium 110, the amount of the transmitted light will be equal to the amount of the reflected light. The return light beam $L_2$, transmitted through the second polarizing beam splitter 22, is converged by enlarging lens systems 23 and 24 on a first photodetector (PD1) 25. The return light beam $L_2$, reflected by the second polarizing beam splitter 22, is converged through a converging lens system 26 and a knife edge 27 to a second photodetector (PD2) 28. Based on the detection signals of the optical output from the photodetectors 25, 28, variable signals, such as RF signals, focusing error signals or tracking error signals may be generated to read out information signals recorded on the optical recording medium 110.

For detecting the focusing error signals, the so-called astigmatic method or the so-called differential concentric method may be used in addition to the above-described knife edge method. For detecting the tracking error signals, the so-called push-pull method, or the so-called differential push-pull method (DPP method) may be used. Moreover, the present optical pickup device is able not only to read out information signals from the optical recording medium but also to write information signals on the optical recording medium 110.

A recording and/or reproducing apparatus may be constructed by providing the optical pickup device, described above, and a recording medium holding mechanism, adapted for holding and rotationally driving the optical recording medium 110, such as an optical disc, as shown in FIG. 45. In the recording and/or reproducing apparatus, shown in FIG. 45, the signals read out by the optical pickup device from the optical recording medium 110 are processed by the signal processing circuit to generate RF signals and various error signals. The signals input to this recording and/or reproducing apparatus from outside are processed by the signal processing circuit so as to be written by the optical pickup device on the optical recording medium 110.

INDUSTRIAL APPLICABILITY

With the objective lens unit manufacturing method and device, according to the present invention, in which a lens is positioned in a cylindrically-shaped lens holder of a synthetic resin material, using another lens, already mounted and secured to the lens holder, as a reference, and the one lens is secured to the lens holder, for setting relative positions of the one and the other lenses, so that a double lens set comprised of two lenses, with a numerical aperture (NA) not less than 0.7, may be assembled efficiently within a short time. Since only the necessary minimum precision may be required of the lens holder, it is possible to enlarge the casting tolerance of the lens holder to improve the yield. Moreover, since the lens interval along the optical axis of the objective lens unit and the parallelism between the lenses are maintained by the precision of the objective lens unit manufacturing device, it is possible to improve the assembling reproducibility and the yield.

With the present invention, it is possible to produce an objective lens unit, with a numerical aperture not less than 0.7, made up by plural lenses, in which the relative positions between the lenses may be adjusted to high accuracy and in which the spherical aberration may be reduced

What is claimed is:

1. An objective lens unit manufacturing method for manufacturing an objective lens unit, with a numerical aperture not less than 0.7, made up by a plurality of lenses, by positioning a lens in a cylindrically-shaped lens holder of a synthetic resin material, using another lens, already mounted and secured to said lens holder, as a reference, and for securing said lens to said lens holder, for setting relative positions of said one and the other lens, said method comprising:

causing a light beam to be incident on the respective lenses in said lens holder;

reflecting said light beam, converged by said respective lenses, by a reflecting member;

causing the light beam reflected by said reflecting member to be re-incident on said respective lenses to detect focusing error signals with respect to said reflecting member, based on a light beam transmitted through said respective lenses; and determining the amount of said spherical aberration in said light beam transmitted through said respective lenses, based on changes in said focusing error signals when said reflecting member is moved along the optical axes of said respective lenses, to adjust the distance between said respective lenses based on the amount of said spherical aberration.

2. An objective lens unit manufacturing apparatus according to claim 1, wherein the reflective member is vibrated along the optical axes of said respective lenses.

3. An objective lens unit manufacturing method for manufacturing an objective lens unit, with a numerical aperture not less than 0.7, made up by a plurality of lenses, in which one lens is secured to a cylindrically-shaped lens holder of a synthetic resin material by being fitted to a lens inserting section of said lens holder, to which another lens is already mounted and secured, with said other lens as positioning reference, for effecting relative positioning of said one and the other lenses, and lens inserting section receiving outer rim portions of said one and the other lenses to control the offset of said one and the other lenses, said method comprising:

causing a light beam to be incident on the respective lenses in said lens holder;

reflecting said light beam, converged by said respective lenses, by a reflecting member;

causing the light beam reflected by said reflecting member to be re-incident on said respective lenses to detect focusing error signals with respect to said reflecting member, based on a light beam transmitted through said respective lenses; and determining the amount of said spherical aberration in said light beam transmitted through said respective lenses, based on changes in said focusing error signals, when said reflecting member is moved along the optical axes of said respective lenses, to adjust the distance between said respective lenses based on the amount of said spherical aberration.

4. An objective lens unit manufacturing method for manufacturing an objective unit, with a numerical aperture not less than 0.7, made up by a plurality of lenses, in which one lens is secured to a cylindrically-shaped lens holder of a synthetic resin material by being fitted to a lens inserting section of said lens holder, to which another lens is already mounted and secured, with said other lens as positioning reference, for effecting relative positioning of said one and the other lenses, said lens inserting section receiving outer rim portions of said one and the other lenses to control the offset of said one and the other lenses, said objective lens unit being used as an objective lens unit for an optical pickup device for writing or reading out information signals on or from an optical recording medium, said method comprising:

determining the distance along the optical axis between the lens surface of said lens closest to an optical recording medium and an end face of the lens holder lying around said lens surface.

5. An objective lens unit manufacturing method for manufacturing an objective lens unit, with a numerical aperture not less than 0.7, made up by a plurality of lenses, in which one lens is positioned and secured to a cylindrically-shaped lens holder of a synthetic resin material by being fitted to a lens inserting section of said lens holder, to which another lens is already mounted and secured, with said other lens as positioning reference, for effecting relative positioning of said one and the other lenses, said lens inserting section receiving outer rim portions of said one and the other lenses to control the offset of said one and the other lenses, said objective lens unit being used as an objective lens unit for an optical pickup device for writing or reading out information signals on or from an optical recording medium, wherein said other lens, used as a positioning reference for said one lens, is the lens remote from the optical recording medium, with the surface of an outer rim of said other lens remote from the optical recording medium being used as a reference surface for positioning said one lens;

the surface of an outer rim of said one lens close to the optical recording medium being used as a positioning reference surface, and wherein in positioning the lens reference surface using a positioning member, the parallelism between said reference surface and said positioning member is measured using laser light.

6. An objective lens unit manufacturing method for manufacturing an objective lens unit, with a numerical aperture not less than 0.7, made up by a plurality of lenses, in which one lens is positioned and secured to a cylindrically-shaped lens holder of a synthetic resin material by being fitted to a lens inserting section of said lens holder, to which another lens is already mounted and secured, with said other lens as positioning reference, for effective relative positioning of said one and the other lenses, said lens inserting section receiving outer rim portions of said one and the other lenses to control the offset of said one and the other lenses, said objective lens unit being used as an objective lens unit for an optical pickup device for writing or reading out information signals on or from an optical recording medium, wherein said other lens, used as a reference for positioning said one lens, is the lens remote from the optical recording medium, with the surface of an outer rim of said other lens remote from the optical recording medium being used as a reference surface for positioning said one lens;

the surface of an outer rim of said one lens close to the optical recording medium being used as a positioning reference surface, and wherein in positioning the lens reference surface using a positioning member, the parallelism between said reference surface and said positioning member is measured with said reference surface abutting against said positioning member.

7. An objective lens unit manufacturing method for manufacturing an objective lens unit, with a numerical aperture not less than 0.7, made up by a plurality of lenses, in which one lens is positioned and secured to a cylindrically-shaped lens holder of a synthetic resin material by being fitted to a lens inserting section of said lens holder, to which another lens is already mounted and secured, with said other lens as positioning reference, for effecting relative positioning of said one and the other lenses, said lens inserting section receiving outer rim portions of said one and the other lenses to control the offset of said one and the other lenses, said objective lens unit being used as an objective lens unit for an optical pickup device for writing or reading out information signals on or from an optical recording medium, wherein said other lens, used as a reference for positioning said one lens, is the lens remote from the optical recording medium, with the surface of an outer rim of said other lens remote from the optical recording medium being used as a reference surface for positioning said one lens;

the surface of an outer rim of said one lens close to the optical recording medium being used as a positioning reference surface, and wherein in positioning the lens reference surface, using a positioning member, the lenses are attracted under a pneumatic pressure differential for abutting said reference surface against said positioning member.

8. An objective lens unit manufacturing method for manufacturing an objective lens unit, with a numerical aperture not less than 0.7, made up by a plurality of lenses, in which one lens is positioned and secured to a cylindrically-shaped lens holder of a synthetic resin material by being fitted to a lens inserting section of said lens holder, to which another lens is already mounted and secured, with said other lens as positioning reference, for effecting relative positioning of said one and the other lenses, said lens inserting section receiving outer rim portions of said one and the other lenses to control the offset of said one and the other lenses, said objective lens unit being used as an objective lens unit for an optical pickup device for writing or reading out information signals on or from an optical recording medium, wherein said other lens, used as a reference for positioning said one lens, is the lens remote from the optical recording medium, with the surface of an outer rim of said other lens remote from the optical recording medium being used as a reference surface for positioning said one lens;

the surface of an outer rim of said one lens close to the optical recording medium being used as a positioning reference surface, and wherein the parallelism between the surface of the outer rim of said other lens remote from the optical recording medium and the surface of the outer rim of said one lens close to said optical recording medium is measured by detecting only the reflected light from the surface of said outer rim of said one lens remote from the optical recording medium, using a photodetector, in a state in which the light is incident on the outer rim of said other lens and in which the light transmitted through said outer rim and reflected by the surface of said outer rim close to said optical recording medium is not returned to said photodetector.

* * * * *

UNITED STATES PATENT AND TRADEMARK OFFICE
CERTIFICATE OF CORRECTION

PATENT NO. : 6,977,782 B2  Page 1 of 1
APPLICATION NO. : 10/399867
DATED : December 20, 2005
INVENTOR(S) : Fumisada Maeda et al.

It is certified that error appears in the above-identified patent and that said Letters Patent is hereby corrected as shown below:

Column 13, line 66, change "a" to --$\alpha$--.

Column 18, line 46, change "still" to --st11--

Signed and Sealed this

Twenty-fifth Day of July, 2006

JON W. DUDAS
*Director of the United States Patent and Trademark Office*